United States Patent
Bleyer et al.

(10) Patent No.: US 11,257,237 B2
(45) Date of Patent: Feb. 22, 2022

(54) OPTIMIZED EXPOSURE CONTROL FOR IMPROVED DEPTH MAPPING

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 223 days.

(21) Appl. No.: 16/555,660

(22) Filed: Aug. 29, 2019

(65) Prior Publication Data
US 2021/0065392 A1 Mar. 4, 2021

(51) Int. Cl.
| | | |
|---|---|---|
| *G06T 7/593* | (2017.01) | |
| *G06K 9/46* | (2006.01) | |
| *H04N 5/235* | (2006.01) | |

(52) U.S. Cl.
CPC ............ *G06T 7/593* (2017.01); *G06K 9/4661* (2013.01); *H04N 5/2353* (2013.01);
(Continued)

(58) Field of Classification Search
CPC .. G06K 9/4661; H04N 5/2353; H04N 5/2354; G06T 2207/10028; G06T 2207/20221
See application file for complete search history.

(56) References Cited

U.S. PATENT DOCUMENTS

| | | |
|---|---|---|
| 7,978,258 B2 | 7/2011 | Christiansen et al. |
| 9,544,503 B2 | 1/2017 | Shroff |

(Continued)

OTHER PUBLICATIONS

Feng, Shijie, et al. "General solution for high dynamic range three-dimensional shape measurement using the fringe projection technique." Optics and Lasers in Engineering 59 (2014): 56-71. (Year: 2014).*

(Continued)

*Primary Examiner* — Pinalben Patel
(74) *Attorney, Agent, or Firm* — Workman Nydegger

(57) ABSTRACT

Disclosed herein are optimized techniques for controlling the exposure time or illumination intensity of a depth sensor. Invalid-depth pixels are identified within a first depth map of an environment. For each invalid-depth pixel, a corresponding image pixel is identified in a depth image that was used to generate the first depth map. Multiple brightness intensities are identified from the depth image. Each brightness intensity is categorized as corresponding to either an overexposed or underexposed image pixel. An increased exposure time or illumination intensity or, alternatively, a decreased exposure time or illumination intensity is then used to capture another depth image of the environment. After a second depth map is generated based on the new depth image, portion(s) of the second depth map are selectively merged with the first depth map by replacing the invalid-depth pixels of the first depth map with corresponding valid-depth pixels of the second depth map.

19 Claims, 20 Drawing Sheets

(52) U.S. Cl.
CPC . *H04N 5/2354* (2013.01); *G06T 2207/10028* (2013.01); *G06T 2207/20221* (2013.01)

(56) References Cited

U.S. PATENT DOCUMENTS

| | | | |
|---|---|---|---|
| 9,918,015 B2 | 3/2018 | Elg et al. | |
| 10,009,554 B1 | 6/2018 | Xiaoyu et al. | |
| 10,021,372 B2 | 7/2018 | Shandon et al. | |
| 10,699,432 B2 * | 6/2020 | Lee | G06T 7/596 |
| 10,999,524 B1 * | 5/2021 | Duelli | G01S 17/894 |
| 2012/0201424 A1 * | 8/2012 | Masalkar | A63F 13/42 |
| | | | 382/106 |
| 2017/0127046 A1 | 5/2017 | Das | |
| 2017/0201665 A1 * | 7/2017 | Yokoya | G03B 7/093 |
| 2017/0289515 A1 * | 10/2017 | Li | H04N 13/156 |
| 2017/0353712 A1 | 12/2017 | Price et al. | |
| 2018/0084240 A1 * | 3/2018 | Campbell | H04N 13/128 |
| 2018/0241927 A1 | 8/2018 | Chen et al. | |
| 2019/0230334 A1 | 7/2019 | Kano | |
| 2020/0209392 A1 * | 7/2020 | Sadhu | G01S 17/89 |
| 2021/0042988 A1 * | 2/2021 | Molyneaux | G06T 15/08 |

OTHER PUBLICATIONS

Adelsberger, et al., "Spatially Adaptive Photographic Flash", In Technical Report No. 612 of Stanford University, Dec. 2008, 12 Pages.

Alexandrov, et al., "High Dynamic Range SLAM with Map-Aware Exposure Time Control", In Journal of Computing Research Repository, Apr. 20, 2018, 9 Pages.

"Non Provisional Application Filed in U.S. Appl. No. 15/937,195", filed Mar. 27, 2018, 62 Pages.

"International Search Report and Written Opinion Issued in PCT Application No. PCT/US20/037115", dated Sep. 2, 2020, 12 Pages.

* cited by examiner

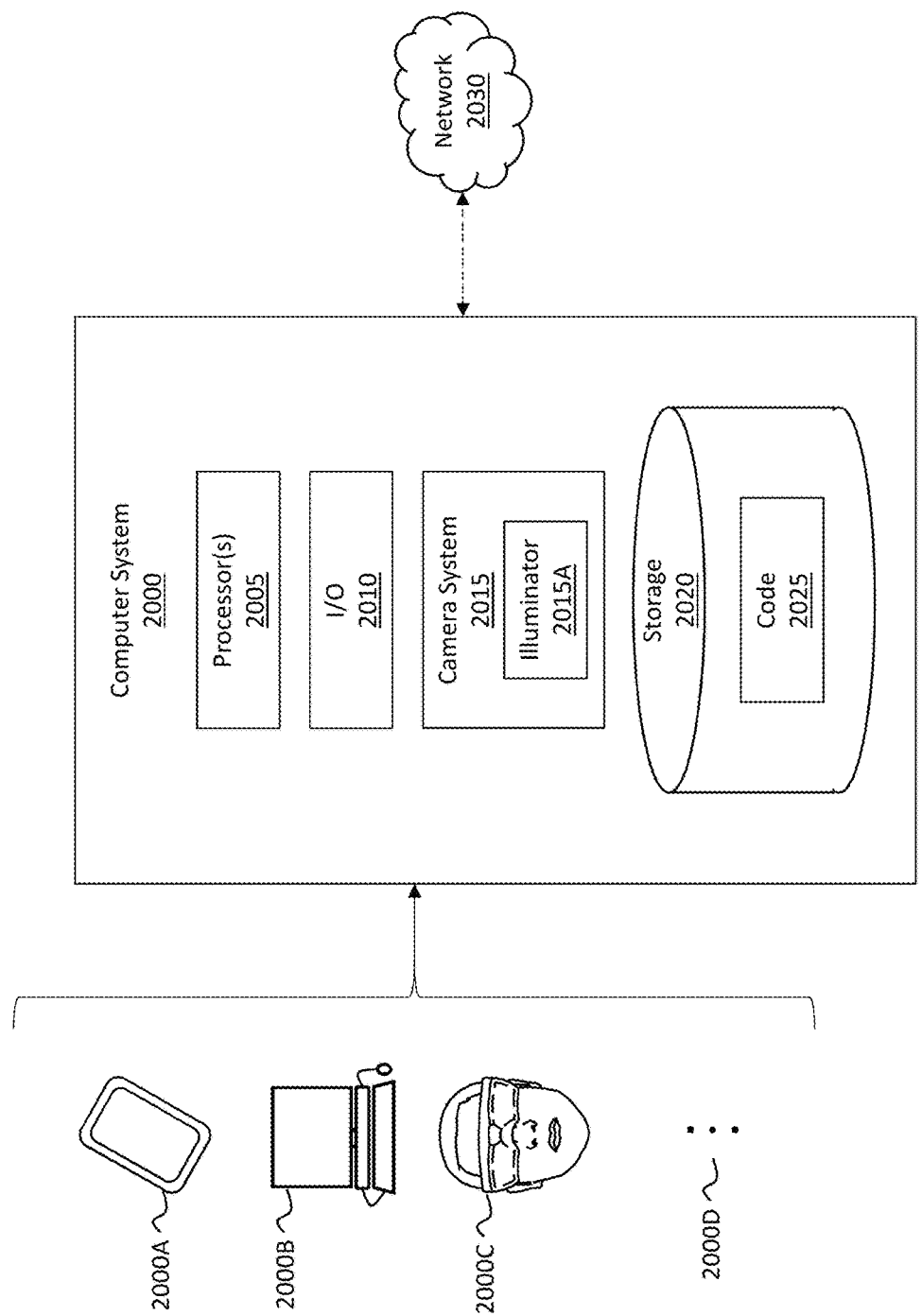

OPTIMIZED EXPOSURE CONTROL FOR IMPROVED DEPTH MAPPING

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," and "hologram" refer to any type of digital image rendered by an MR system. Furthermore, it should be noted that a head-mounted device (HMD) typically provides the display used by the user to view and/or interact with holograms provided within an MR scene.

An MR system's HMD typically includes one or more different depth detection sensors. These sensors can be used to scan and map out an environment, including any objects in the environment. To do so, a depth detection system, which includes the sensors, typically uses the sensors to obtain one or more depth images of the environment. These depth images include depth data detailing the distance from the sensor to any objects captured by the depth images (e.g., a z-axis range or measurement). Once these depth images are obtained, then a depth map can be computed from the data in the images.

A depth map details the positional relationship and depths relative to objects in the environment. Consequently, the positional arrangement, location, geometries, and depths of objects relative to one another can be determined. From the depth maps (and possibly the depth images), a surface reconstruction mesh and/or a three-dimensional (3D) point cloud can be computed to provide a three-dimensional digital representation of the environment. Accordingly, although techniques are in place to map out an environment, these techniques can still be improved, especially when mapping an environment that has a highly dynamic brightness range (e.g., bright areas, dim areas, or combinations of bright and dim areas).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, methods, and devices (e.g., hardware storage devices, head-mounted devices, etc.) that improve how depth mapping is performed for environments having a broad dynamic brightness range. Specifically, the disclosed embodiments selectively and dynamically adjust one or more of an exposure time or an illumination intensity of a depth camera (or depth sensor) to obtain new depth data from a second depth map to compensate for deficiencies identified within a first depth map and to facilitate obtaining new depth pixels from the second depth map to replace invalid-depth pixels in the first depth map.

In some embodiments, invalid-depth pixels are identified within a first depth map of an environment. For each of at least some of these invalid-depth pixels, a corresponding image pixel is identified in a first set of one or more depth image(s) that were used to generate the first depth map. This identification process also includes identifying a brightness intensity for the corresponding image pixel (e.g., in the depth image(s)), such that multiple different brightness intensities are identified. Each one of these brightness intensities is then categorized as corresponding to a correctly exposed image pixel, an overexposed image pixel, or an underexposed image pixel in the first set of depth image(s). Here, overexposed image pixels correspond to bright areas (or highly reflective surfaces) in the environment while underexposed image pixels correspond to dim areas (or low reflective surfaces) in the environment. As compared to a previous exposure time that was used when capturing the first set of depth image(s), either an increased exposure time or a decreased exposure time is used to then capture a second set of one or more depth image(s) of the environment. After a second depth map is generated based on the second set of depth image(s), which were captured using either the increased or decreased exposure time, one or more portion(s) of the second depth map are selectively merged with the first depth map by replacing the invalid-depth pixels of the first depth map with corresponding newly acquired valid-depth pixels of the second depth map.

Some embodiments use depth data from a second depth map, which was designed to compensate for certain depth deficiencies identified within a first depth map and which was generated by selectively adjusting an intensity of illumination that was caused to be projected by a depth sensor to provide additional illumination for dark areas of an environment or to provide less illumination for bright areas, to thereby selectively resolve the deficiencies in the first depth map. To do so, invalid-depth pixels are identified within a first depth map of an environment. For each of at least some of these invalid-depth pixels, a corresponding image pixel is identified in a first set of one or more depth image(s) that were used to generate the first depth map. This identification process also includes identifying a brightness intensity for the corresponding image pixel. Each brightness intensity is categorized as corresponding to a correctly exposed image pixel, an overexposed image pixel, or an underexposed image pixel in the first set of depth image(s). As compared to a previous intensity of illumination that was caused to be projected by a depth sensor and that was used when capturing the first set of depth image(s), an increased illumination intensity or a decreased illumination intensity is then used to capture another set of one or more depth image(s) of the environment. After a second depth map is generated based on the new depth image(s), the embodiments resolve the invalid-depth pixels in the first depth map by replacing those invalid-depth pixels with corresponding newly acquired valid-depth pixels obtained from the second depth map, which newly acquired valid-depth pixels were captured as a result of using either the increased intensity of illumination or the decreased intensity of illumination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 20 illustrates an example of a computer system or computer architecture that can be configured to perform any of the disclosed operations.

DETAILED DESCRIPTION

Figure 1:
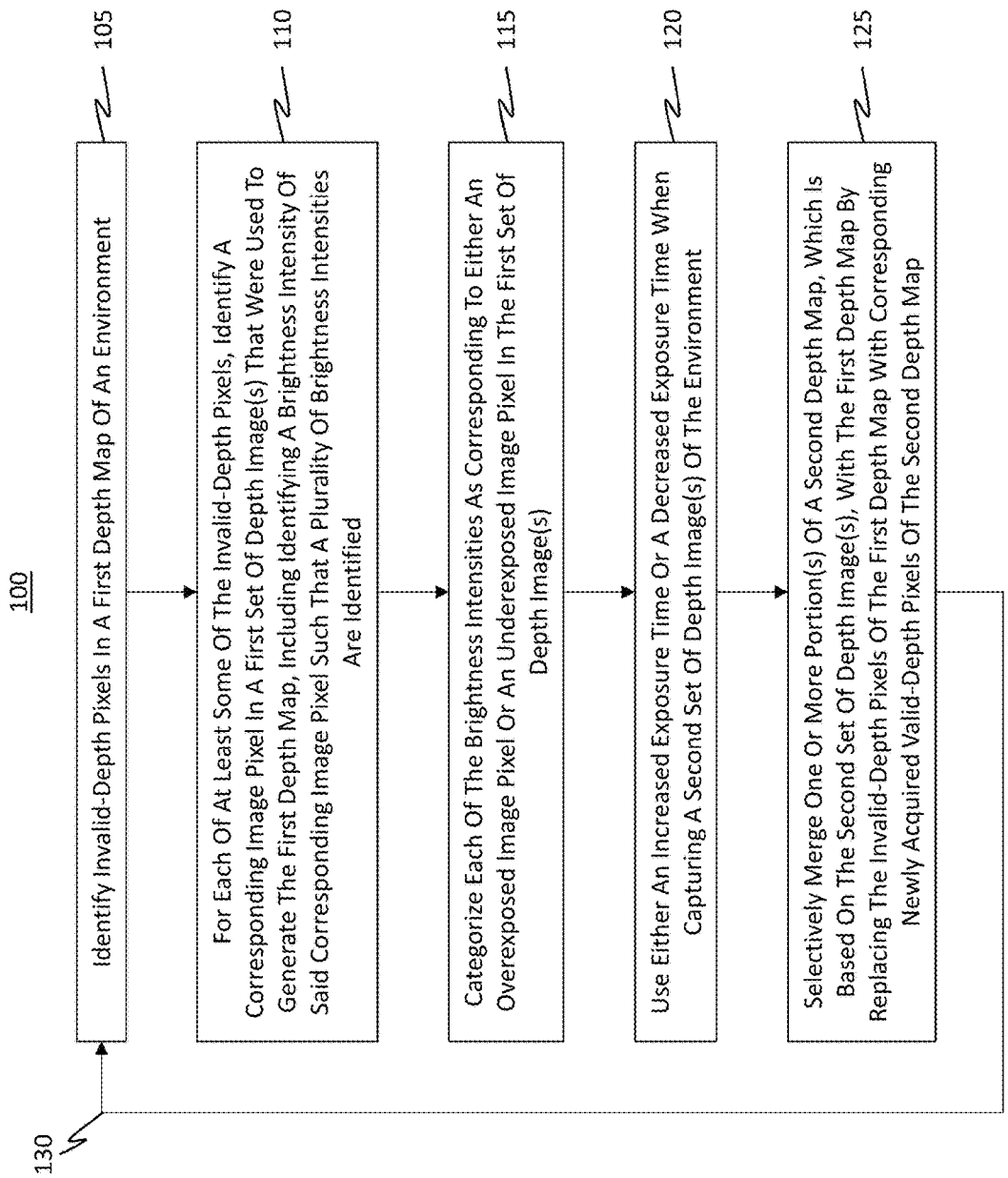
FIG. 1 illustrates a flowchart of an example method for using depth information from a subsequent depth to compensate for certain depth deficiencies identified within an earlier depth map. Here, the subsequent depth map is designed to specifically capture depths for the deficient areas that were identified in the initial depth map, even if that design results in some other areas of the subsequent depth map becoming invalid.

Embodiments disclosed herein relate to systems, methods, and devices (e.g., hardware storage devices, head-mounted devices, etc.) that improve how depth mapping is performed for environments having a high dynamic range. As an initial matter, it should be noted that, as used herein, "image pixels" correspond to pixels in a "depth image" while "depth pixels" (e.g., "invalid-depth pixels" and "valid-depth pixels") correspond to pixels in a "depth map." A depth map is generated based on the depth information included within any number of depth images.

In some embodiments, invalid-depth pixels are identified within a first/earlier depth map. Corresponding image pixels are then identified in a first/earlier set of depth image(s) that were used to generate the first/earlier depth map. Brightness intensities for those image pixels are also extracted or identified from the depth image(s). Each brightness intensity is then categorized as corresponding to either an overexposed/oversaturated image pixel or an underexposed image pixel. Overexposed image pixels correspond to bright areas (or highly reflective surfaces) in the environment and underexposed image pixels correspond to dim areas (or low reflective surfaces). Either an increased exposure time or a decreased exposure time is then used to capture a second/subsequent set of depth image(s) of the environment. After a second/subsequent depth map is generated based on the second/subsequent set of depth image(s), one or more portion(s) of the second/subsequent depth map are selectively merged with the first/earlier depth map by replacing the invalid-depth pixels of the first/earlier depth map with corresponding newly acquired valid-depth pixels of the second/subsequent depth map. This process may repeat until a certain number of iterations occur or until a certain accuracy threshold or level is achieved within each newly-merged resulting depth map.

Some embodiments use depth data from a second depth map, which was designed to compensate for certain depth deficiencies identified within a first depth map and which was generated by selectively adjusting an intensity of illumination that was caused to be projected by a depth sensor to provide additional illumination for dark areas of an environment or to provide less illumination for bright areas, to thereby selectively resolve the deficiencies in the first depth map. To do so, invalid-depth pixels are identified within a first depth map of an environment. For each invalid-depth pixel, a corresponding image pixel is identified in a first set of one or more depth image(s) that were used to generate the first depth map. This identification process also includes identifying a brightness intensity for each image pixel. As compared to a previous intensity of illumination that was caused to be projected by a depth sensor and that was used to when capturing the first set of depth image(s), an increased or a decreased illumination intensity is then used to capture another depth image of the environment. After a second depth map is generated based on the new depth image, the embodiments resolve the invalid-depth pixels in the first depth map by replacing those invalid-depth pixels with corresponding newly acquired valid-depth pixels obtained from the second depth map.

Example Technical Benefits, Advantages, and Practical Applications

The following section outlines some example improvements and practical applications provided by the disclosed embodiments. It will be appreciated, however, that these are just examples only and that the embodiments are not limited to only these improvements.

Although techniques are in place to generate depth maps for environments, these techniques are quite inadequate with regard to generating accurate depth maps for environments having high dynamic ranges (i.e. environments having bright areas, dim areas, or combinations of bright and dim areas). To clarify, the disclosed embodiments provide substantial benefits to the technical field by improving how highly dynamic environments are mapped. Because dynamic environments are prevalent, the disclosed embodiments provide real and practically applicable improvements for depth sensing and detection.

In some cases, the disclosed embodiments bring about these improvements by performing operations that may seem contrary to traditional techniques. That is, traditional techniques typically attempted to achieve or obtain an exposure time for the image sensor that optimized the grey counts for the pixels in the sensor image (e.g., by obtaining an increased or maximum average intensity for the combination of all of the pixels). The information from the image sensor and images were then used to generate a depth map. Traditional design considerations often resulted in the depth map having numerous depth inaccuracies/deficiencies, which occurred as a result of certain regions of the depth image being overexposed or underexposed. For instance, in high dynamic range environments, because the image sensor was exposed to balance the exposure over the whole image, and because the image sensor has a limited dynamic range (e.g., determined by the full well capacity of the sensor and the noise floor of the readout circuitry) the resulting image may have underexposed or overexposed regions. For instance, any image pixels corresponding to environmental areas that were too brightly lit or too dimly lit were often either overexposed or underexposed. The resulting depth processing engine was unable to calculate depth values for regions of the image that were overexposed or underexposed. The resulting depth map was then severely deficient in those areas because the depths in those areas could not be resolved.

In contrast to these traditional techniques, the disclosed embodiments purposefully design a subsequent depth image (or any number of depth images) to have increased or reduced resolutions for only a selected subset of image pixels (e.g., by increasing or decreasing the depth sensor's exposure time) while ignoring/disregarding how these design operations/parameters will impact the resolutions for other image pixels in the subsequent depth image. The resulting/subsequent depth map, which is built from the subsequent depth image, will then have improved (in terms of accuracy) depth measurements for only specific areas of the environment while potentially also having diminished (in terms of accuracy) depth measurements for other areas of the environment (e.g., as compared to an earlier depth map). The improved depth measurements can then be extracted from the subsequent depth map and merged into the earlier depth map to resolve any deficiencies identified in that earlier depth map. Accordingly, by disregarding the impact on the overall average resolution of image pixels in a depth image and instead by focusing on increasing the resolution of only a few certain image pixels, the disclosed embodiments provide substantial improvements that may seem contrary to traditional techniques. Ignoring or disregarding some depth measurements that do not improve the earlier depth map thus promotes efficiency in managing computing resources and processes.

These benefits can also be achieved by selectively increasing or decreasing the illumination intensity of the depth sensor. Furthermore, combinations of increasing or decreasing both the exposure time and the illumination intensity may result in even greater improvements to the accuracy of the resulting depth maps. Therefore, as will be discussed in more detail later, dynamically adjusting an exposure time, an illumination intensity, or a combination of adjustments to the exposure time and the illumination intensity may be used to improve depth detection.

In this regard, the disclosed embodiments are directed to techniques that improve depth mapping of an environment. These techniques are especially beneficial for environments containing surfaces having drastically different reflectivity (e.g., bright and dim surfaces or areas), which surfaces may not be able to be captured accurately with a single exposure. Accordingly, by dynamically adjusting the exposure time or illumination intensity of a depth sensor, the embodiments are able to obtain improved depth signals and measurements for those regions in a depth image that either currently have no depth measurement or have a reduced resolution measurement. These processes can be performed for any type of environment, area, or surface, even for surfaces or areas that have a high dynamic range (i.e. differing reflectivity).

Example Methods for Improving the Accuracy of a Depth Map

As an initial matter, it is noted that MR systems are often used in many different environments. Some environments are brightly lit, some are dimly lit, and some have combinations of brightly lit areas and dimly lit areas. As an example, consider an office room. Here, the office may have a window and a desk abutting the window. If the sun is shining through the window, then the top of the desk may be brightly illuminated by the sun while the area underneath the desk may be dim or perhaps even very dark.

For reference, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a "dim" or "low" light environment or area at least corresponds to any environment or area in which the ambient light intensity is at or below about 40 lux. Similarly, a "bright" light environment or area at least corresponds to any environment or area in which the ambient light intensity is at or above about 5,000 lux.

Instead of referring only to bright or dim areas, some embodiments rely on reflectivity measurements. For instance, the operations discussed herein for "bright" areas can also be performed for highly reflective surfaces and the operations discussed herein for "dim" areas can be performed for low reflective surfaces. Therefore, although the remaining portion of this disclosure focuses on dim and bright areas, the principles are equally applicable to low and high reflective surfaces, where a "high" reflective surface is any surface whose reflectivity satisfies an upper reflectivity threshold and where a "low" reflective surface is any surface whose reflectivity satisfies a lower reflectivity threshold.

As indicated earlier, when performing surface reconstruction or depth mapping for an environment, a depth sensor scans the environment and generates any number of depth images. These depth images include data representing a distance between objects in the environment and the depth sensor. Often, this depth data is represented as a brightness intensity value and is provided for each image pixel in the depth image. For instance, image pixels having relatively "higher" or "brighter" brightness intensity values typically indicate that an object captured by those image pixels is relatively nearer to the depth sensor. In contrast, image pixels having relatively "lower" or "dimmer" brightness intensity values typically indicate that an object captured by those image pixels is relatively farther from the depth sensor.

When a depth sensor scans an environment that has dim, bright, or a combination of dim and bright areas, then some image pixels of the resulting depth images may be underexposed (e.g., for dim areas) or overexposed (e.g., for bright areas), thereby causing depth inaccuracies or deficiencies in the resulting depth map. For example, any bright areas may result in oversaturated/overexposed image pixels being included in the depth images, and any dim areas may result in underexposed image pixels being included in the depth images. When a depth map is generated based on the depth information included in the depth images, the resulting depth map will include deficiencies because the dim and/or bright areas will not have accurate depth values in the depth map. The disclosed embodiments can be used to improve how depth maps are generated in order to provide more accurate depth measurements, even for environments having dim, bright, or a combination of dim and bright areas.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 1 illustrates a flowchart of an example method 100 for using a subsequent depth map to compensate for, or rectify, certain deficiencies identified within a previous depth map. It should be noted that a depth map can be used to generate any three-dimensional (3D) representation of the environment. For instance, based on the depth map (or perhaps even based on the depth images), a surface reconstruction mesh (e.g., a mesh that includes polygons describing the shapes, geometries, and contours of the environment), a 3D point cloud (e.g., a compilation of dots or points that are used to digitally represent the environment), or any other 3D digital representation of the environment can be generated.

Method 100 initially includes an act (act 105) of identifying invalid-depth pixels in a first/previous depth map of an environment. This first depth map can be generated in real-time (e.g., by an HMD) or it could have been generated at an earlier time and retained in storage (e.g., either locally on the HMD or in a cloud environment). As described earlier, a depth map can be generated from any number of depth images of the environment. Depth images can be generated from many different types of devices, one of which is an HMD. As used herein, the term "HMD" can be used interchangeably with "MR system."

Figure 2:
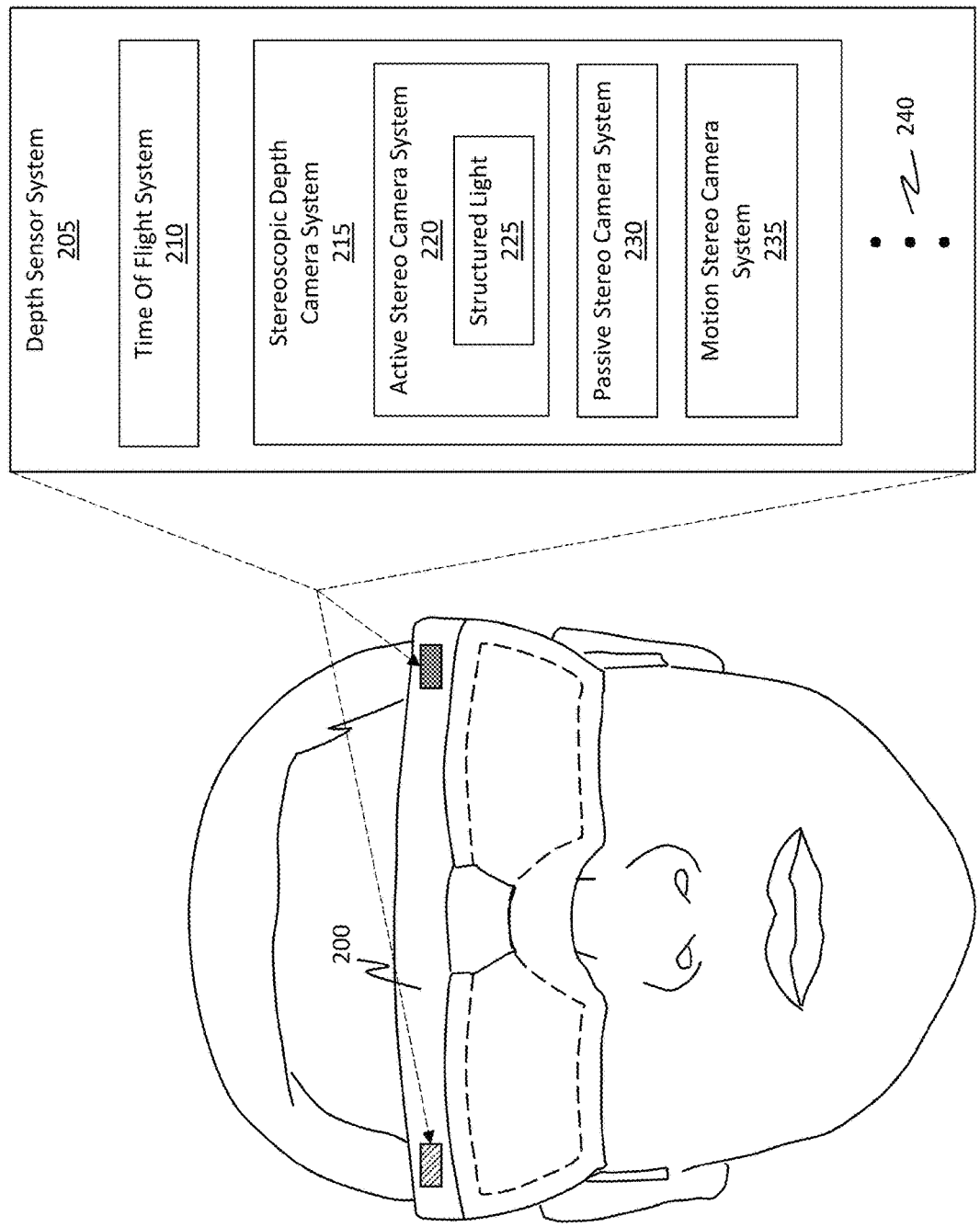
FIG. 2 illustrates a head-mounted device (HMD) that includes any type of depth sensor, where the depth sensor can be used to obtain depth images. This HMD can perform the method described in FIG. 1 or any other operation disclosed herein.

FIG. 2 illustrates an example HMD 200 that can be used to perform any of the method acts of method 100. For instance, HMD 200 can be used to generate depth images, generate a depth map, acquire depth images and/or depth maps from the cloud, or even analyze attributes of depth maps to identify invalid-depth pixels. As shown, HMD 200 includes a depth sensor system 205, which comprises any number or type of depth sensors.

For example, in some embodiments, depth sensor system 205 includes a time of flight system 210 and/or a stereoscopic depth camera system 215. Both of these types of depth sensing systems are generally known in the art and will not be described in detail herein.

In some embodiments, the stereoscopic depth camera system 215 may be configured as an active stereo camera system 220, which projects light (e.g., visible light and/or infrared light) into the environment to better determine depth. In some cases, the projected/illuminated light is structured light 225 (e.g., light that is projected using a known pattern so as to provide artificial texture to the environment). In some embodiments, the stereoscopic depth camera system 215 is configured as a passive stereo camera system 230 or perhaps even as a motion stereo camera system 235. The ellipsis 240 is provided to illustrate how the depth sensor system 205 may include any number and/or any other type of depth sensing unit. As such, the embodiments are not limited only to those units shown in FIG. 2.

In some cases, HMD 200 can be used to scan or map an environment by capturing any number of depth images of that environment. These depth images can then be used to generate the depth map described in act 105 of method 100. In some instances, HMD 200 itself generates the depth map while in other instances the depth images are uploaded to a cloud service, which then generates the depth map.

In some embodiments, HMD 200 acquires the first depth map described in act 105 from another entity, such as from the cloud or another HMD. For instance, a different HMD or a different depth sensor may have been used to previously scan the environment. The resulting depth map, which was formed from the scans of the environment, can then be uploaded into the cloud. At a later time, HMD 200 can then acquire the depth map from the cloud. Accordingly, the disclosed embodiments are able to either generate a depth map in real-time or acquire a previously-generated depth map.

Figure 3:
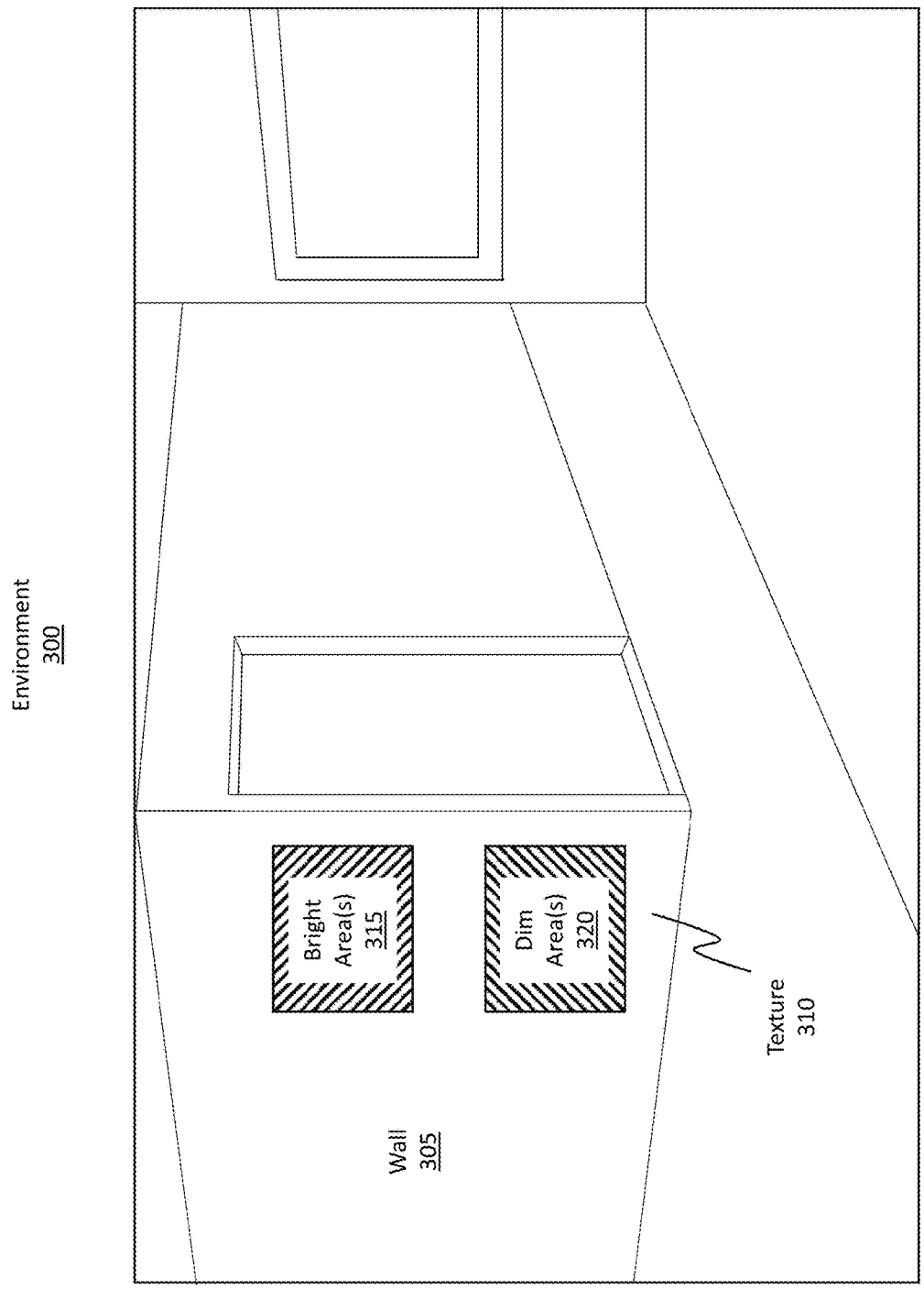
FIG. 3 illustrates an example of an environment having a high dynamic brightness range. Specifically, some areas of the environment are brightly lit areas while some other areas of the environment are dimly lit areas.

FIG. 3 illustrates an example environment 300 that may be representative of the environment described in act 105 of method 100. Here, environment 300 is shown as being an indoor environment that includes a wall 305, which may or may not have texture 310. Wall 305 is shown as having a bright area(s) 315 (e.g., perhaps occurring as a result of sunlight or other light shining on that portion of wall 305) and a dim area(s) 320 (e.g., perhaps occurring as a result of a dark shadow covering that portion of wall 305). Although the bright area(s) 315 is shown as being near or proximate to the dim area(s) 320, it will be appreciated that these illustrations are provided for example purposes only. Some environments may have bright area(s) far removed from dim area(s). Accordingly, environment 300 is representative of an environment that has a highly dynamic brightness range comprising bright area(s), dim area(s), and moderately lit areas (i.e. the other areas in environment 300 not specifically identified as being bright or dim).

Figure 4:
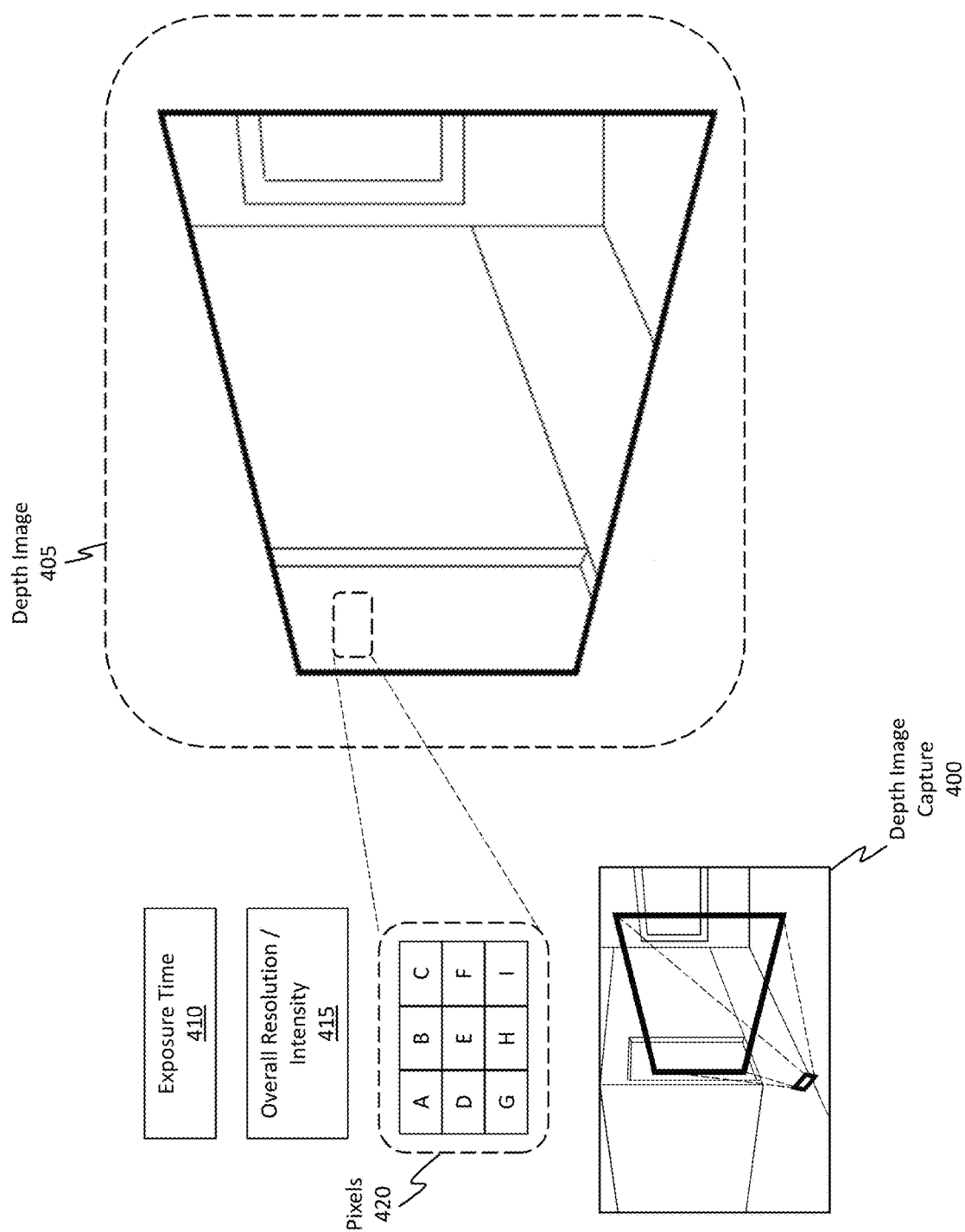
FIG. 4 illustrates an example of a depth image that is obtained using a depth sensor.

At some point, in order to generate the depth map described in act 105, one or more depth image(s) were acquired of environment 300. FIG. 4 shows an example scenario where a depth image is being generated for environment 300 of FIG. 3. Specifically, the illustration labeled depth image capture 400 shows how a depth sensor is obtaining or capturing a depth image 405 of environment 300. It should be noted that in this disclosure, depth images are illustrated without any indications regarding depth. Typically, however, depth images use a greyscale color gradient to reflect depth. As also used herein, the depth maps are illustrated as having a greyscale color gradient to reflect depth. Typically, however, depth maps are simply a compilation of depth values. As such, it will be appreciated that these illustrations are being provided for example purposes only and may not reflect the true visual nature of actual depth images and/or depth maps.

To capture depth image 405, a depth sensor (e.g., the depth sensor system 205 on I-MD 200 of FIG. 2) is exposed to capture light photons of the environment for a determined exposure time 410. Often, the exposure time 410 is within the range spanning between 0.1 milliseconds and 30 milliseconds, though smaller or larger exposure times can be used. It is also often the case that the exposure time 410 is initially set in an effort to have a maximum overall average resolution or intensity for all of the image pixels in the depth image 405. To clarify, the exposure time 410 is typically initially set so that the overall resolution/intensity 415 of the depth image 405's pixels (as a combined whole) achieve a maximum or at least a heightened resolution requirement (or intensity requirement).

To illustrate, depth image 405 is shown as including any number of pixels 420. In FIG. 4, nine pixels are illustrated (e.g., pixels A, B, C, D, E, F, G, H, and I), but it will be appreciated that any number of pixels may be used (e.g., thousands, millions, or any number without limit). In the example shown in FIG. 4, the exposure time 410 is often initially set so that the resolutions or intensities for pixels A-I (as a collective whole) is as high as possible.

Figure 5:
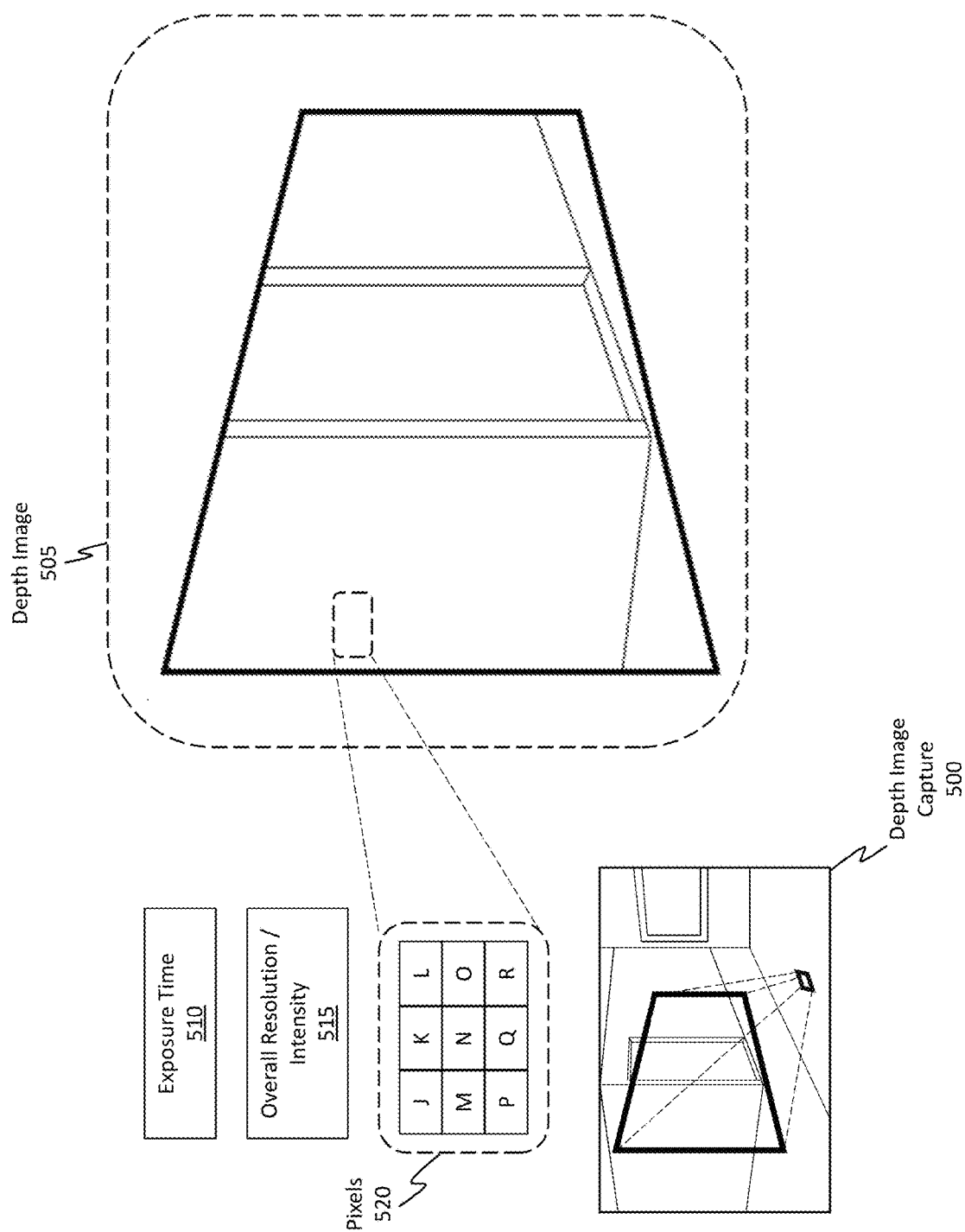
FIG. 5 illustrates another example of a depth image.

Similar to FIG. 4, FIG. 5 illustrates another scenario in which a depth image is being generated. With stereoscopic depth systems, multiple depth images are generated. Therefore, as will be described later, the combination of the depth images in FIGS. 4 and 5 can be used to determine depths for the environment.

Similar to FIG. 4, the illustration labeled depth image capture 500 shows how a depth sensor is obtaining or capturing a depth image 505 of environment 300 from FIG. 3. FIG. 5 also shows an exposure time 510, an overall resolution/intensity 515, and pixels 520 (e.g., pixels J, K, L, M, N, O, P, Q, and R), which are similar to exposure time 410, overall resolution/intensity 415, and pixels 420 from FIG. 4 (though pixels 520 may be capturing different areas of the environment than pixels 420 of FIG. 4).

Figure 6:
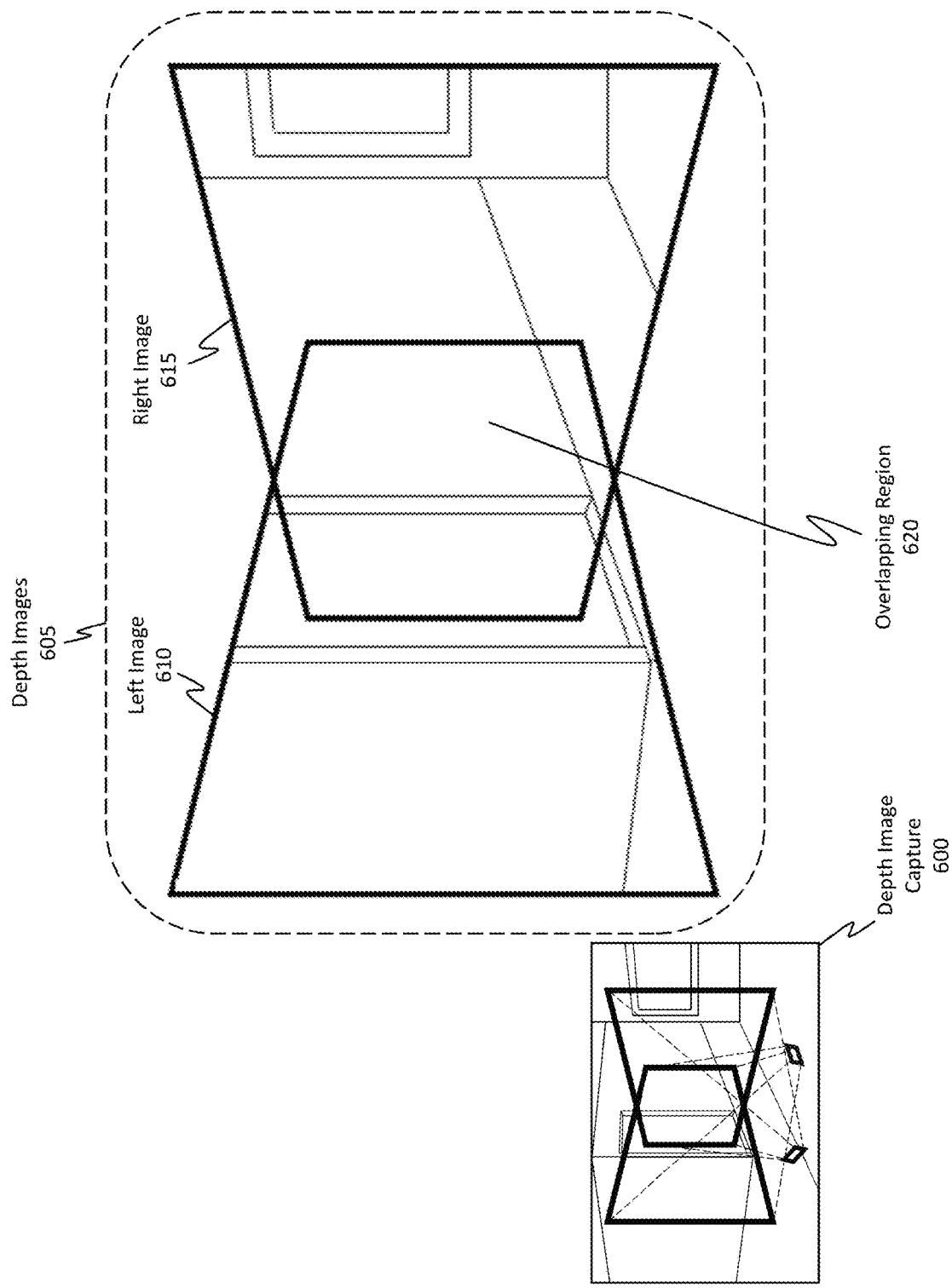
FIG. 6 illustrates a combination of depth images.

FIG. 6 illustrates a scenario in which multiple depth images are being captured for environment 300 of FIG. 3, as shown by the illustration labeled depth image capture 600. Here, the resulting depth images 605 include a left image 610 and a right image 615. A portion of the left image 610 overlaps with a portion of the right image 615, as shown by the overlapping region 620. Stereoscopic depth camera systems are able to determine depth by measuring the disparity between these two images. Accordingly, FIG. 6 illustrates one example technique for obtaining depth data using a stereoscopic method (e.g., depth images 605 can be an example of a first set of depth images that are captured using a stereoscopic depth camera system). Of course, other types of depth detection may be used as well (e.g., the time of flight and other techniques mentioned earlier).

Figure 7:
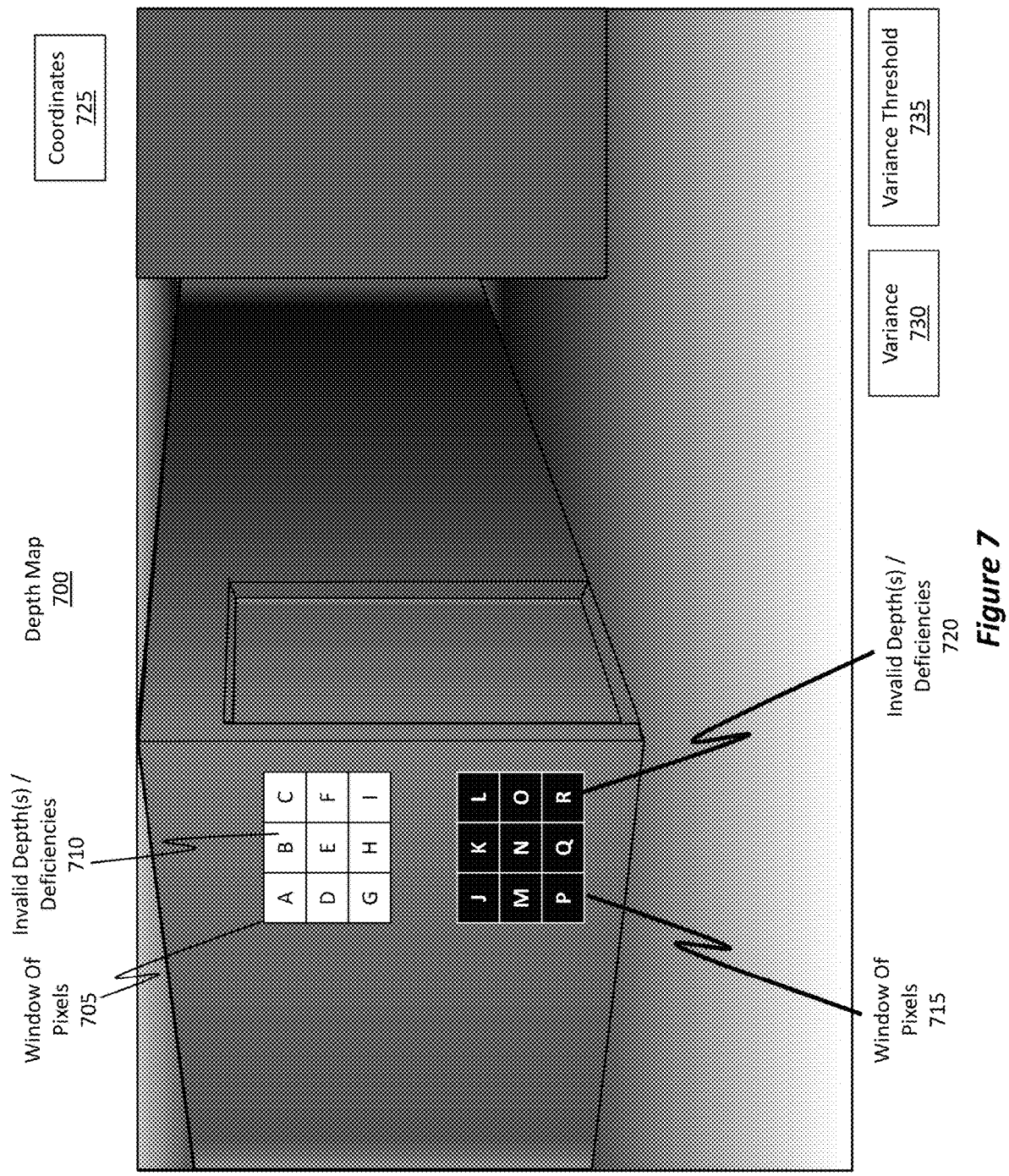
FIG. 7 illustrates an example of a resulting depth map, which is generated from any number of depth images. Here, the depth map is shown as having multiple different deficiencies because some of the depth pixels in the depth map reflect invalid depths.

FIG. 7 illustrates how a first/initial depth map 700 can be generated based on the depth information included within any number of depth images (e.g., the depth images 605 from FIG. 6). Depth map 700 is also representative of the "first depth map" described in connection with act 105 of method 100.

Here, depth map 700 is shown as having a grey-scale color gradient corresponding to depths of environment 300 from FIG. 3. Because environment 300 included bright area(s) 315 and dim area(s) 320 (and those areas were either overexposed or underexposed in the depth images), depth map 700 is shown as including a number of depth deficiencies/inaccuracies.

Specifically, the window of pixels 705 is shown as including depth pixels A, B, C, D, E, F, G, H, and I and correspond to the same location as bright area(s) 315 from FIG. 3. Depth pixels A-I are invalid-depth pixels (because the corresponding image pixels in the depth images were overexposed) and are labeled as invalid depth(s)/deficiencies 710. Furthermore, depth pixels A-I are shown in white color because the image pixels in the earlier depth images were overexposed due to the bright light striking the bright area(s) 315. Accordingly, invalid-depth pixels of this first depth map (i.e. depth map 700) represent how depth map 700 includes one or more deficiencies with regard to depths of an environment.

Similarly, the window of pixels 715 is shown as including depth pixels J, K, L, M, N, O, P, Q, and R and correspond to the same location as dim area(s) 320 from FIG. 3. Depth pixels J-R are also invalid-depth pixels (because the corresponding image pixels in the depth images were underexposed) and are labeled as invalid depth(s)/deficiencies 720. Furthermore, depth pixels J-R are shown in black color because the image pixels in the earlier depth images were underexposed due to the dim light in the dim area(s) 320.

In some cases, a depth pixel coordinate value (e.g., labeled as "coordinates 725" in FIG. 7) can be determined for each depth pixel in the depth map 700. Coordinates 725 identify where (e.g., an x-coordinate value and an y-coordinate value) in the depth map 700 a particular pixel (e.g., perhaps pixel A) is located. Coordinates 725 are useful to help locate which pixels are invalid or valid, as will be described in more detail later. FIG. 7 also illustrates variance 730 and variance threshold 735. These concepts will also be discussed in more detail later.

Returning to FIG. 1, method 100 also includes an act (act 110) where, for each of at least some of the invalid-depth pixels (e.g., pixels A-R in FIG. 7), a corresponding "image pixel" is identified in a first set of one or more depth image(s) that were used to generate the first depth map (e.g., depth map 700 of FIG. 7). For instance, the left image 610 and the right image 615 from FIG. 6 are examples of the one or more depth image(s) described in method act 110.

Figure 8:
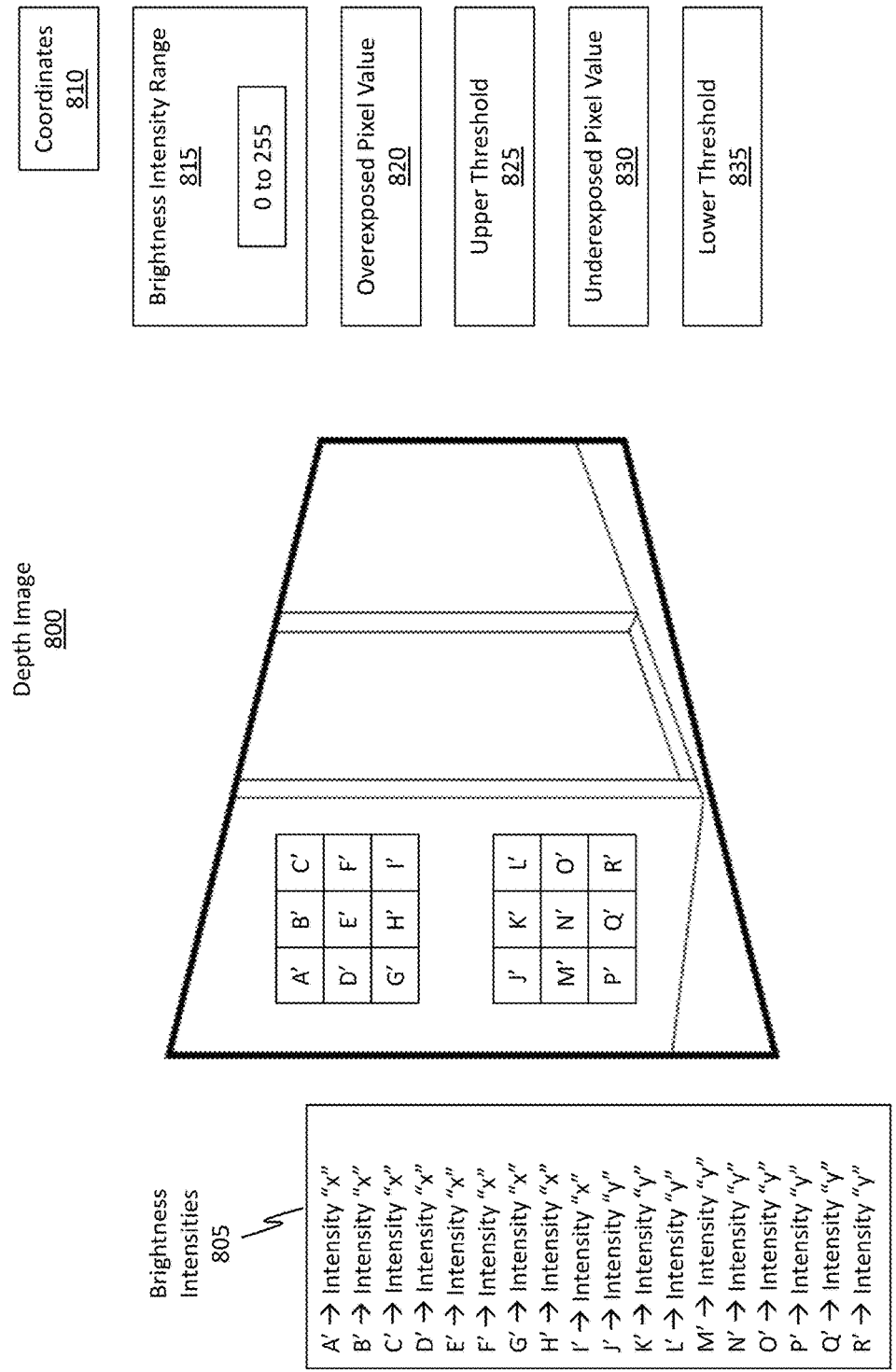
FIG. 8 illustrates how certain "image pixels" can be identified within a depth image. These "image pixels" were either oversaturated/overexposed or underexposed and caused "depth pixels" in the resulting depth map to have invalid-depth measurements (i.e. those depth pixels in the depth map are categorized as being invalid-depth pixels). Additionally, brightness intensities can be identified for the image pixels.

FIG. 8 shows another example of a depth image 800 that may be included as a part of the one or more depth image(s) described in method act 110. Specifically, depth image 800 is shown as including image pixels A', B', C', D', E', F', G', H', I', J', K', L', 14', N', 0', P', Q', and R'. Image pixel A' in FIG. 8 corresponds to invalid-depth pixel A in FIG. 7. Image pixel B' in FIG. 8 corresponds to invalid-depth pixel B in FIG. 7. Similarly, image pixels C', D', E', F', G', H', I', J', K', L', M', N', 0', P', Q', and R' in FIG. 8 correspond to invalid-depth pixels C, D, E, F, G, H, I, J, K, L, M, N, O, P, Q, and R in FIG. 7, respectively. The coordinates 725 for each invalid depth pixel from FIG. 7 can be used to identify those depth pixels' corresponding image pixels in the depth image 800. For instance, FIG. 8 shows how coordinates 810 for the image pixels can be identified within depth image 800. Coordinates 725 can be compared against coordinates 810 to ensure that image pixel A' from the depth image 800 actually does correspond with, or align with, depth pixel A from the depth map 700.

In this regard, some embodiments identify coordinates of invalid-depth pixels in a first or previous depth map (e.g., coordinates 725 from FIG. 7). The embodiments then use these coordinates from the first depth map to identify overexposed or underexposed image pixels in a set of depth images (e.g., by comparing depth pixel coordinates 725 against image pixel coordinates 810 to identify corresponding pixels between the depth map and the depth image). This process can be used to help identify which specific image pixels in the depth images caused the inaccuracies in the depth map.

The process of identifying the corresponding "image pixels" in the depth images (i.e. act 110) also includes identifying brightness intensities (also known as grey level counts or greyscale counts) for those image pixels such that multiple or a plurality of brightness intensities are identified (e.g., this process can be performed for only the invalid-depth pixels and can be refrained or prevented from being performed for valid-depth pixels). FIG. 8 shows how brightness intensities 805 can be identified for each pixel A' through R'. Brightness intensities for any image pixels have values that typically fall within a particular range, as shown by brightness intensity range 815. FIG. 8 shows that brightness intensity range 815 spans values from 0 up to and including 255. It will be appreciated that these are example values only and that other values can also be used.

Returning to FIG. 1, method 100 includes an act (act 115) of categorizing each brightness intensity in the plurality of brightness intensities as corresponding to either an overexposed image pixel or an underexposed image pixel in the first set of one or more depth image(s). Here, overexposed image pixels correspond to bright areas in the environment and underexposed image pixels correspond to dim areas in the environment.

Using FIG. 8 as an example, image pixels A' through I' will be characterized or categorized as being overexposed (or oversaturated) image pixels because the areas those pixels correspond to were oversaturated with light (e.g., they were in the area corresponding to the bright area(s) 315 in FIG. 3). Consequently, pixels A' through I' have an overexposed pixel value 820.

In the brightness intensity range 815, the value 255 corresponds to an overexposed pixel. In some cases, however, values proximate to or near to 255 can also be classified as being overexposed. As such, some embodiments utilize an upper threshold 825 for determining whether an image pixel should be labeled as being overexposed.

In some embodiments, the upper threshold 825 is set to a value of 1, such that image pixels having a brightness intensity of 254 or 255 are categorized as being overexposed. In some embodiments, the upper threshold 825 is set to a value of 2, 3, 4, 5, 6, 7, 8, 9, 10, or more than 10. It will be appreciated that this upper threshold 825 can be set to any value. Therefore, as an additional example, when the upper threshold 825 is set to a value of about 5, then image pixels having brightness intensities of 250, 251, 252, 253, 254, or 255 will all be categorized or identified as being overexposed and will be included among the overexposed image pixels. Accordingly, brightness intensities for overexposed image pixels can be within a first threshold value (e.g., the upper threshold 825) of 255.

In FIG. 8, image pixels J' through R' will be characterized or categorized as being underexposed image pixels because the areas where those image pixels correspond to were underexposed with light (e.g., they were in the area corresponding to the dim area(s) 320 in FIG. 3). Consequently, pixels J' through R' have an underexposed pixel value 830.

With regard to the brightness intensity (greyscale count) range 815, the value 0 corresponds to an underexposed pixel. In some cases, however, values proximate to or near to 0 can also be classified as being underexposed. As such, some embodiments utilize a lower threshold 835 for determining whether an image pixel should be labeled as being underexposed. In some embodiments, the lower threshold 835 is set to a value of 1, such that image pixels having a brightness intensity of 0 or 1 are categorized as underexposed. In some embodiments, the lower threshold 835 is set to a value of 2, 3, 4, 5, 6, 7, 8, 9, 10, or more than 10. It will be appreciated that this lower threshold 835 can be set to any value. As an additional example, when the lower threshold 835 is set to a value of about 5, then image pixels having brightness intensities of 0, 1, 2, 3, 4, or 5 will all be categorized or identified as being underexposed and will be included among the underexposed image pixels. Accordingly, brightness intensities for underexposed image pixels can be within a second threshold value (e.g., the lower threshold 835) of 0. If an 8-bit image is used, then the thresholds can be adjusted to reflect the characteristics of that image as well. When the thresholds are set to 10, then the ranges can be 0-10 for the lower threshold region and 245-255 for the upper threshold region.

In some cases, the upper threshold 825 is set to be the same value as the lower threshold 835 while in other cases the upper threshold 825 is set to be a different value than the lower threshold 835. Differences between the two threshold values can be dependent on the amount of ambient light that is detected in the environment. For instance, if the amount of average ambient light satisfies a particular low threshold value, then the lower threshold 835 may be set to a relatively higher value as compared to the value set for the upper threshold 825 (e.g., the lower threshold 835 may be set to 30 while the upper threshold 825 may be set to 5). Similarly, if the amount of average ambient light satisfies a particular high threshold value, then the upper threshold 825 may be set to a relatively higher value as compared to the value set for the lower threshold 835. Accordingly, environmental factors may influence the upper and lower thresholds.

Figure 9:
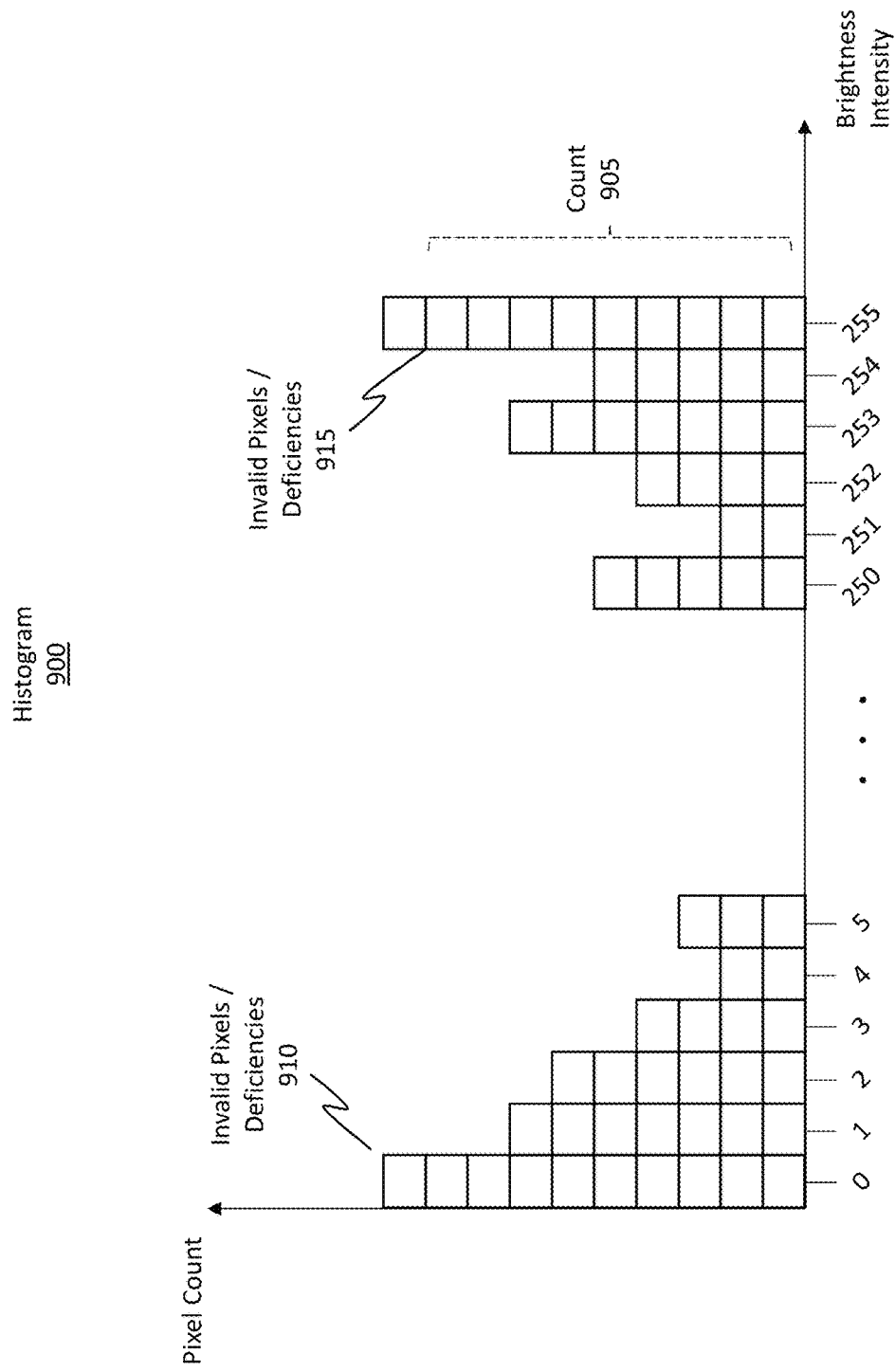
FIG. 9 illustrates an example of a histogram that provides a visual representation of a plotted relationship between the count or number of image pixels and those pixels' brightness intensities. Notably, the histogram can be used to plot only over- or underexposed image pixels (i.e. deficient pixels that caused invalid-depth pixels to be included in the resulting depth map).

In some cases, as illustrated in FIG. 9, the image pixel brightness intensities (e.g., brightness intensities 805 from FIG. 8) can be plotted, charted, or graphed on a histogram 900. In most cases, histogram 900 will chart only the brightness intensities for image pixels that correspond to invalid-depth pixels from the depth map. For example, because image pixels A' through R' in FIG. 8 correspond to invalid-depth pixels A through R of FIG. 7, histogram 900 will plot the brightness intensities only for image pixels A' through R'. That is, histogram 900 can refrain from plotting brightness intensities for valid-depth pixels (i.e. those brightness intensities can be filtered from consideration or graphing).

Histogram 900 is shown as plotting a count 905 of the number of image pixels (e.g., obtained from depth image 800) relative to brightness intensity. In this case, both the upper and lower thresholds (e.g., upper threshold 825 and lower threshold 835) were set to a value of 5 (though any value can be used). Consequently, any image pixels having brightness intensities between 0-5 and 250-255 were plotted. As such, the brightness intensities (as determined by the depth images) were plotted on the histogram 900.

In some cases, invalid-depth pixels from a depth map can be used to identify over- or underexposed image pixels in a depth image while in other cases over- or underexposed image pixels in a depth image can be used to identify invalid-depth pixels in a depth map. For example, by identifying over- or underexposed image pixels through the use of the upper and lower thresholds and the histogram 900, the embodiments can then identify depth pixels (e.g., within the depth map) that correspond to the over- or underexposed image pixels and that are likely to be considered invalid-depth pixels. Likewise, by identifying invalid-depth pixels in the depth map, the embodiments can then identify over- or underexposed image pixels in the depth images.

Accordingly, some embodiments will additionally generate a histogram. In some cases, this histogram provides a count indicating how many over- or underexposed image pixels are included in a depth image, and the count of the over- or underexposed image pixels can also be used to infer or determine the number of invalid-depth pixels that are included in the first/previous depth map. This histogram can be formatted to illustrate the count based on brightness intensities, as shown by FIG. 9.

To illustrate, in FIG. 9, there were 10 image pixels identified as having a brightness intensity of 0, there were 7 image pixels identified as having a brightness intensity of 1, there were 6 image pixels identified as having a brightness intensity of 2, there were 4 image pixels identified as having a brightness intensity of 3, there were 2 image pixels identified as having a brightness intensity of 4, and there were 3 image pixels identified as having a brightness intensity of 5.

Similarly, there were 10 image pixels identified as having a brightness intensity of 255, there were 5 image pixels identified as having a brightness intensity of 254, there were 7 image pixels identified as having a brightness intensity of 253, there were 4 image pixels identified as having a brightness intensity of 252, there were 2 image pixels identified as having a brightness intensity of 251, and there were 5 image pixels identified as having a brightness intensity of 250.

Image pixels having brightness intensity values between 0-5 are identified as being underexposed and thus labeled as invalid pixels/deficiencies 910, and image pixels having brightness intensity values between 250-255 are identified as being overexposed and thus labeled as invalid pixels/deficiencies 915. Furthermore, by viewing this particular histogram 900, it can be recognized that there are two primary "modes," with one mode encompassing the pixels having values between 0-5 and a second mode encompassing the pixels having values between 250-255. It should be noted that while the majority of this disclosure focuses on scenarios in which any number of individual pixels are considered when performing the disclosed operations, that may not always be the case. For instance, instead of relying on specific individual pixels, some embodiments rely on sub-regions of the depth image. That is, when depth alignment is performed (e.g., to be discussed later in connection with at least FIG. 17), some embodiments align based on subregions and not individual pixels. Accordingly, the disclosed processes should be interpreted broadly to include scenarios in which individual pixels are analyzed and manipulated and situations in which entire subregions (i.e. collections of a plurality of pixels) are analyzed and manipulated.

As used herein, the term "mode" can refer to a high peak in the histogram. This high peak represents a particular value that has occurred most frequently relative to the other peaks in the histogram. In some embodiments, the term "mode" also refers to a collection of multiple, proximately-positioned peaks. For instance, with reference to FIG. 9, some embodiments combine the peaks that are included within the upper or lower threshold values discussed earlier. If the upper and lower thresholds were 5, then the peaks corresponding to brightness intensity values of 0, 1, 2, 3, 4, and 5 would be grouped together and classified as a single mode, and the peaks for the brightness intensity values of 250, 251, 252, 253, 254, and 255 would be grouped together and classified as another single mode. Accordingly, a single peak in the histogram may be considered a mode, or multiple peaks may be grouped together and be considered a mode. As will be described in more detail later, the number of modes can be used to determine how many subsequent depth maps should be generated.

Returning to FIG. 1, method 100 includes an act 120 of using either an increased exposure time or a decreased exposure time to then capture a second set of depth image(s) of the environment. To clarify, as compared to a previous exposure time (e.g., exposure time 410 in FIG. 4 or exposure time 510 in FIG. 5) that was used when the first set of one or more depth image(s) (e.g., depth image 405 in FIG. 4, depth image 505 in FIG. 5, and/or depth images 605 in FIG. 6) were captured, either an increased exposure time or a decreased exposure time is used when capturing a second set of one or more depth image(s) of the environment.

In some embodiments, increasing or decreasing the exposure time can be performed by identifying groups of image pixels that are either overexposed or underexposed. Once these groups are identified, then the average brightness intensities for each group can be determined (e.g., overexposed image pixels will typically have an average intensity closer to a value of 255 whereas underexposed image pixels will typical have an average intensity closer to a value of 0). Numerous techniques or algorithms can then be used to dynamically adjust the exposure time, as will be described in more detail later. In one embodiment, however, the following technique is used: New Exposure Time=Old Exposure Time*128/I, where "I" is the average intensity value for either the overexposed image pixel group or the underexposed image pixel group. By way of example, suppose the overexposed image pixel group has an average intensity of 255. The new exposure time would then be reduced by a factor of 2. Similarly, suppose the underexposed image pixel group has an average intensity of 64. In this case, the new exposure time will be increased by a factor of 2.

Some embodiments use the following technique to dynamically adjust the exposure time: New Exposure Time=Old Exposure Time*(2−I/170). This equation is particularly beneficial to achieve a 2× change in exposure time. Some embodiments adjust the exposure time differently. For example, a 2× increase in underexposed pixels results in a 1 stop change. For some high dynamic range (HDR) image processes described herein, it is often beneficial to change by 3 or more stops (i.e. a factor of 8). Any of the disclosed equations or algorithms can be additionally raised to a set power (e.g., to the second or third power) to achieve a more pronounced increase or decrease.

Accordingly, some embodiments base the exposure time on the amount of detected over- or underexposed image pixels. To illustrate, if a threshold number of invalid image pixels are detected (i.e. a threshold number of over- or underexposed image pixels), then the embodiments are able to dynamically increase or decrease the exposure time more significantly (e.g., by increase 3×, 4×, 5×, 6×, 7×, 8×, 9×, 10×, and so on), such as going from a 30 millisecond exposure time to a 3 millisecond exposure time. Similar considerations can be used to increase the exposure time.

Figure 10:
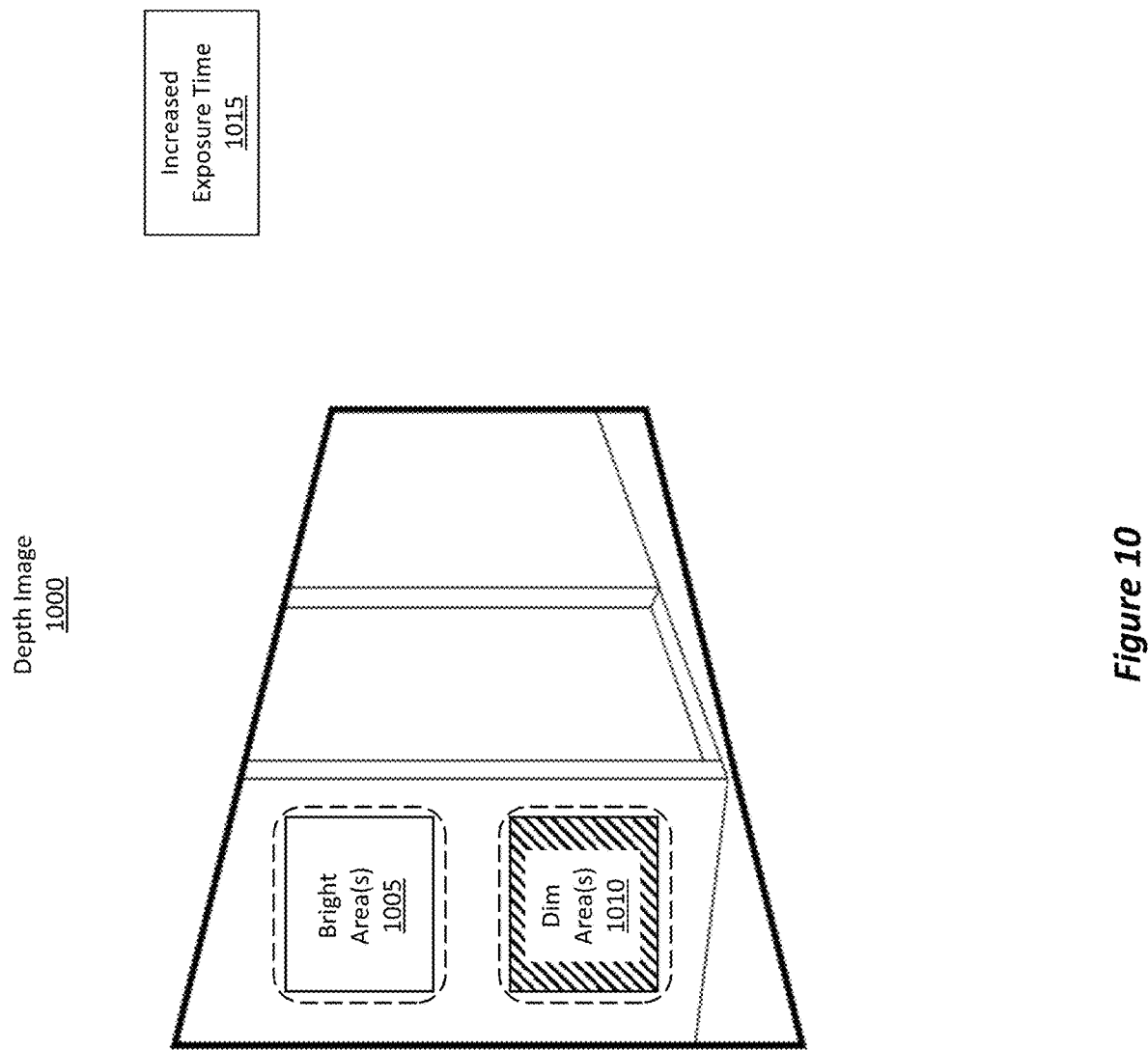
FIG. 10 illustrates a scenario in which an exposure time of a depth sensor is increased to obtain more accurate depth measurements for dimly lit areas in an environment, which dimly lit areas were previously underexposed and thus were not accurately reflected in an earlier depth map. By prolonging the exposure time, the depth sensor will be able to acquire additional photons for those dim areas thereby leading to improved depth information for those dim areas, which information can then be merged with the earlier depth map to resolve the earlier inaccuracies/deficiencies.

FIG. 10 shows a depth image 1000 that can be included in the second set of depth images described in method act 120. In this particular scenario (though this may not always be the case), depth image 1000 captured both a bright area(s) 1005, which corresponds to bright area(s) 315 in FIG. 3, and a dim area(s) 1010, which corresponds to dim area(s) 320. Furthermore, depth image 1000 was specifically captured in an effort to collect additional (or an increased number of) photons for the dim area(s) 1010 while disregarding how this design parameter will impact the resolution for other areas of depth image 1000, including the bright area(s) 1005.

Collecting additional photons is achieved by using an increased exposure time 1015 for the depth sensor. That is, by allowing the depth sensor's sensing unit to be active for a prolonged or increased period of time, the depth sensor will be able to collect more light photons for dim or dark areas. Consequently, the resulting depth image 1000 will be able to identify depths for those dim area(s) 1010, whereas the previous depth pixels of the previous images (e.g., depth image 800 from FIG. 8) were underexposed in those dim areas and thus caused the resulting depth map 700 in FIG. 7 to be deficient in the areas corresponding to the invalid depth(s)/deficiencies 720. In FIG. 10, the area corresponding to the bright area(s) 1005 is shown in white to illustrate how that area will continue to be overexposed due to the use of a prolonged exposure time. Additional detail on the duration of the increased exposure time 1015 will be provided later.

Figure 11:
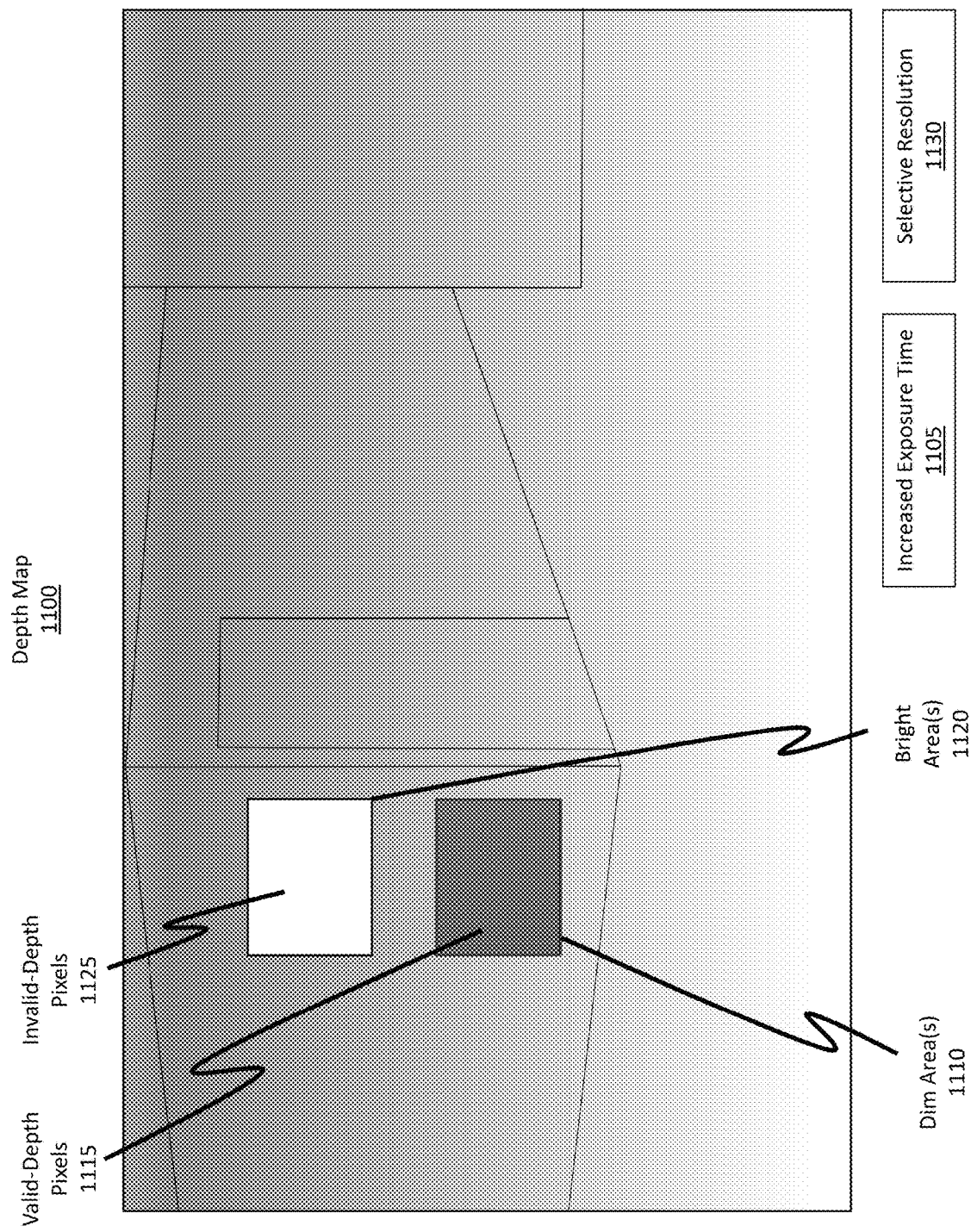
FIG. 11 illustrates how, as a result of using a prolonged, lengthened, or increased exposure time to capture depth data for dimly lit areas, the dimly lit areas are now accurately described (in terms of depth) in the resulting depth map. Here, the brightly lit areas are overexposed.

FIG. 11 shows a resulting depth map 1100 that is generated based on the depth information included in the depth image 1000 of FIG. 10. Specifically, an increased exposure time 1105, corresponding to increased exposure time 1015, was used for the depth images (e.g., depth image 1000) that were used to generate depth map 1100. Depth map 1100 is shown as having accurate depth readings for the dim area(s) 1110, which correspond to the dim area(s) 1010, where the improved accuracy is illustrated by the valid-depth pixels 1115. In contrast, depth map 1100 is shown as having inaccurate depth readings for the bright area(s) 1120, which correspond to the bright area(s) 1005, as illustrated by the invalid-depth pixels 1125. It should be noted that the remaining portions of the depth map 1100 are illustrated as being brighter or having a higher intensity (e.g., in FIG. 11, this brightness is illustrated by less dark regions in the Figure) as a result of using an increased exposure time (i.e. more photons are collected). In some cases, this increased brightness may actually result in some areas of this new depth map 1100 actually becoming invalid because those areas may have been overexposed. The disclosed embodiments disregard that potential consequence, however, because it is desirable to obtain accurate depth readings for the dim area(s) 1110 (the other areas may have already been accurately reflected in an earlier depth map).

It should be noted that depth image 1000 and the resulting depth map 1100 were designed to achieve only a selective resolution 1130 for the depth/image pixels corresponding to the dim area(s) 1110. That is, the embodiments disregarded how the increased exposure time parameter would impact any other pixels when selecting the time values for the increased exposure time. Instead, the embodiments emphasized or prioritized obtaining an increased, maximized, or improved resolution only for depth/image pixels corresponding to the dim area(s) 1110 while disregarding, ignoring, or deprioritizing the resolution for any other depth/image pixels. The embodiments performed this selective resolution operation in order to use the newly acquired (and more accurate) depth data corresponding to the valid-depth pixels 1115 to fix, compensate, supplement, or otherwise augment the deficiencies that previously existed in depth map 700 of FIG. 7 for the areas corresponding to the dim areas (e.g., the invalid pixels J through R). Accordingly, a second or subsequent depth map can be generated to compensate for certain deficiencies of a first or previous depth map.

Figure 12:
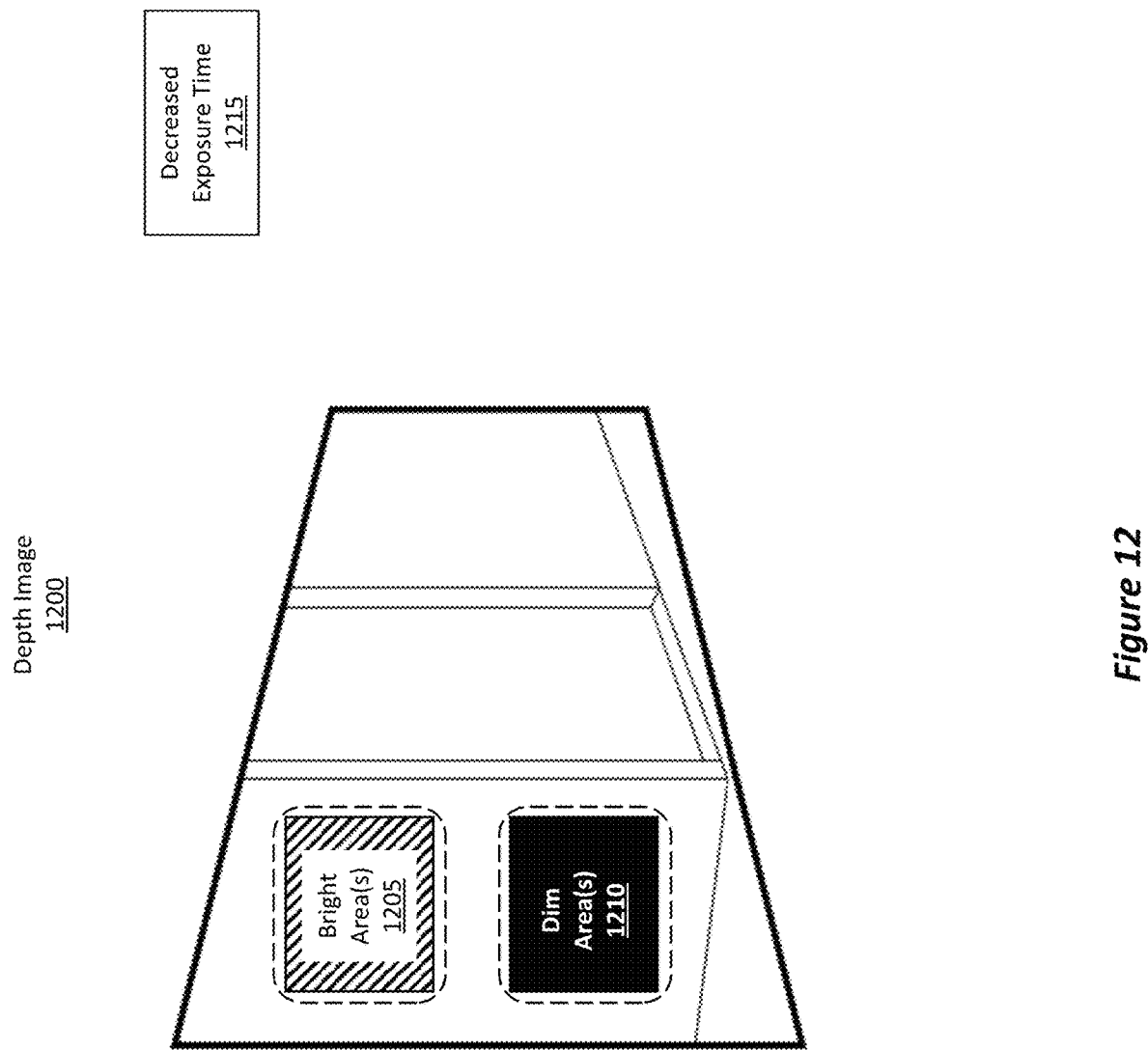
FIG. 12 illustrates a scenario in which an exposure time of a depth sensor is decreased to obtain more accurate depth measurements for brightly lit areas in an environment, which brightly lit areas were previously overexposed and thus were not accurately reflected in an earlier depth map. By decreasing the exposure time, the depth sensor will be able to acquire fewer photons for those bright areas thereby leading to improved depth information for those bright areas, which information can then be merged with the earlier depth map to resolve the earlier inaccuracies/deficiencies.
Figure 13:
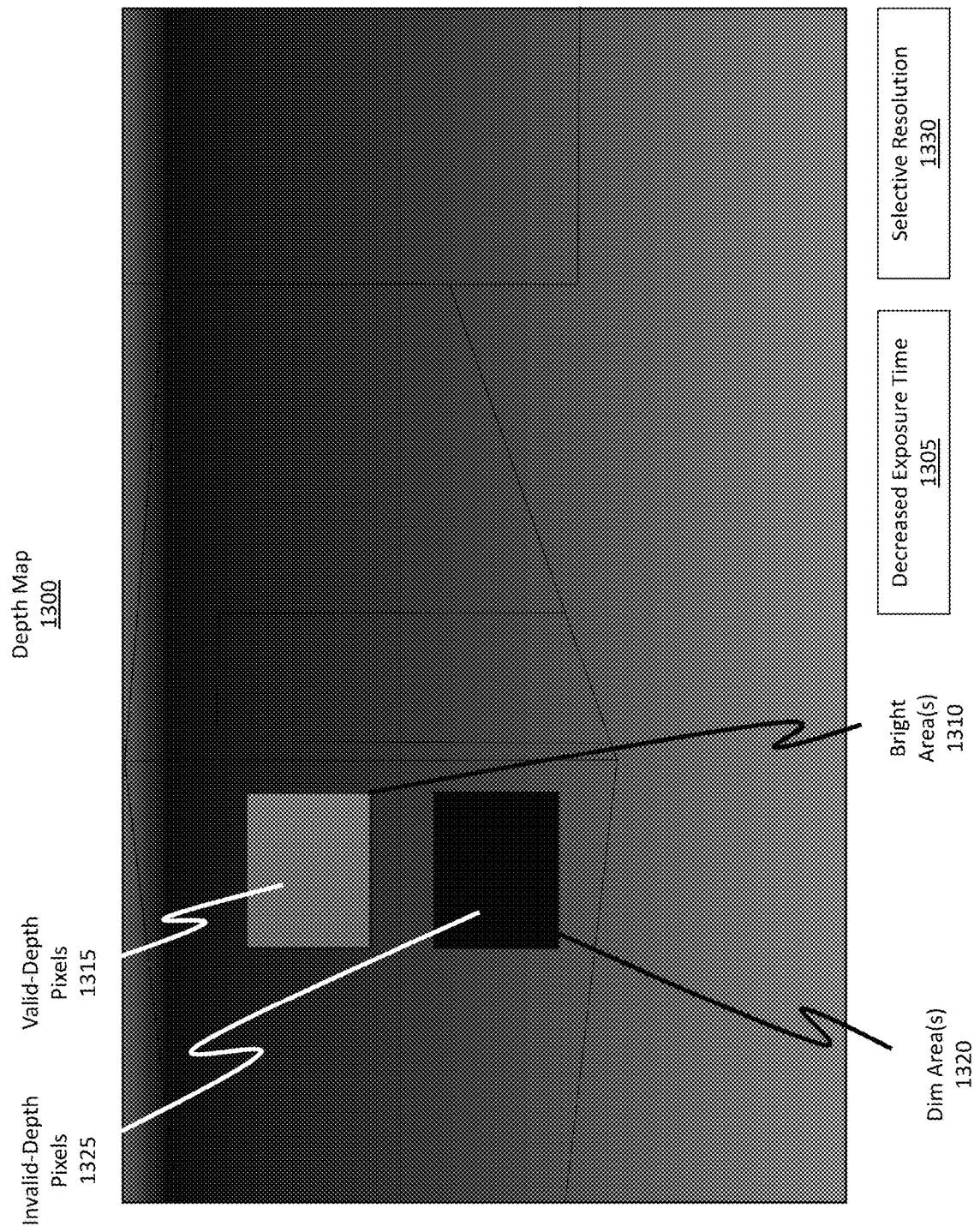
FIG. 13 illustrates how, as a result of using a reduced, decreased, or minimized exposure time to capture depth data for brightly lit areas, the brightly lit areas are now accurately described (in terms of depth) in the resulting depth map. Here, the dimly lit areas are underexposed.

While FIGS. 10 and 11 were directed to generating a subsequent depth map focused on acquiring additional depth data for dimly lit areas (i.e. underexposed image pixel areas) in order to compensate for the deficient depth data of an earlier depth map (at dimly lit areas), FIGS. 12 and 13 are focused on generating a subsequent depth map to resolve or compensate for brightly lit areas (i.e. oversaturated/overexposed pixel areas).

Specifically, FIG. 12 shows a depth image 1200 that can also be included in the second set of depth images described in method act 120. In this particular scenario (though this may not always be the case), depth image 1200 captured both the bright area(s) 1205, which corresponds to bright area(s) 315 in FIG. 3, and dim area(s) 1210, which corresponds to dim area(s) 320. Furthermore, depth image 1200 was specifically captured in an effort to collect fewer (or a reduced number of) photons for the bright area(s) 1205.

Collecting fewer photons is achieved by using a decreased exposure time 1215 for the depth sensor. That is, by allowing the depth sensor's sensing unit to be active for a reduced or retracted period of time, the depth sensor will collect fewer light photons for bright areas. Consequently, the resulting depth image 1200 will be able to more accurately identify depths for those bright area(s) 1205, whereas the image pixels in the previous depth images (e.g., depth image 800 from FIG. 8) were overexposed in those bright areas and thus caused the resulting depth map 700 in FIG. 7 to be deficient in the areas corresponding to the invalid depth(s)/ deficiencies 710. In FIG. 12, the area corresponding to the dim area(s) 1210 is shown in black to illustrate how that area will continue to be underexposed because a reduced or decreased exposure time was used (relative to the exposure times that were used earlier). Further detail on the duration of the decreased exposure time 1215 will be provided later.

FIG. 13 shows a resulting depth map 1300 that is generated based on the depth information included in the depth image 1200 of FIG. 12. Specifically, a decreased exposure time 1305 (corresponding to decreased exposure time 1215 in FIG. 12) was used for the depth images (e.g., depth image 1200) that were used to generate depth map 1300. Depth map 1300 is shown as having accurate depth readings for the bright area(s) 1310, which correspond to the bright area(s) 1205, as illustrated by the valid-depth pixels 1315. In contrast, depth map 1300 is shown as having inaccurate depth readings for the dim area(s) 1320, which correspond to the dim area(s) 1210, as illustrated by the invalid-depth pixels 1325. It should be noted that the remaining portions of the depth map 1300 are illustrated as being darker or having a lower intensity (e.g., in FIG. 13, this darkness is illustrated by more dark regions in the Figure) as a result of using a decreased exposure time (i.e. less photons are collected). In some cases, this decreased brightness may actually result in some areas of this new depth map 1300 actually becoming invalid because those areas may have been underexposed. The disclosed embodiments disregard that potential consequence, however, because it is desirable to obtain accurate depth readings for the bright area(s) 1310 (the other areas may have already been accurately reflected in an earlier depth map).

It should be noted that depth image 1200 and the resulting depth map 1300 were designed to achieve only a selective resolution 1330 for the depth/image pixels corresponding to the bright area(s) 1310. That is, the embodiments disregarded how the decreased exposure time parameter would impact any other pixels when selecting the time values for the decreased exposure time. Instead, the embodiments emphasized or prioritized obtaining an increased, maximized, or improved resolution only for depth/image pixels corresponding to the bright area(s) 1310 (e.g., by reducing the exposure time and collecting a reduced number of photons) while disregarding, ignoring, or deprioritizing the resolution for any other depth/image pixels. The embodiments performed this selective resolution operation in order to use the newly acquired (and more accurate) depth data corresponding to the valid-depth pixels 1315 to fix, compensate, supplement, or otherwise augment the deficiencies that previously existed in depth map 700 of FIG. 7 for the areas corresponding to the bright areas (e.g., the invalid pixels A through I).

Figure 14:
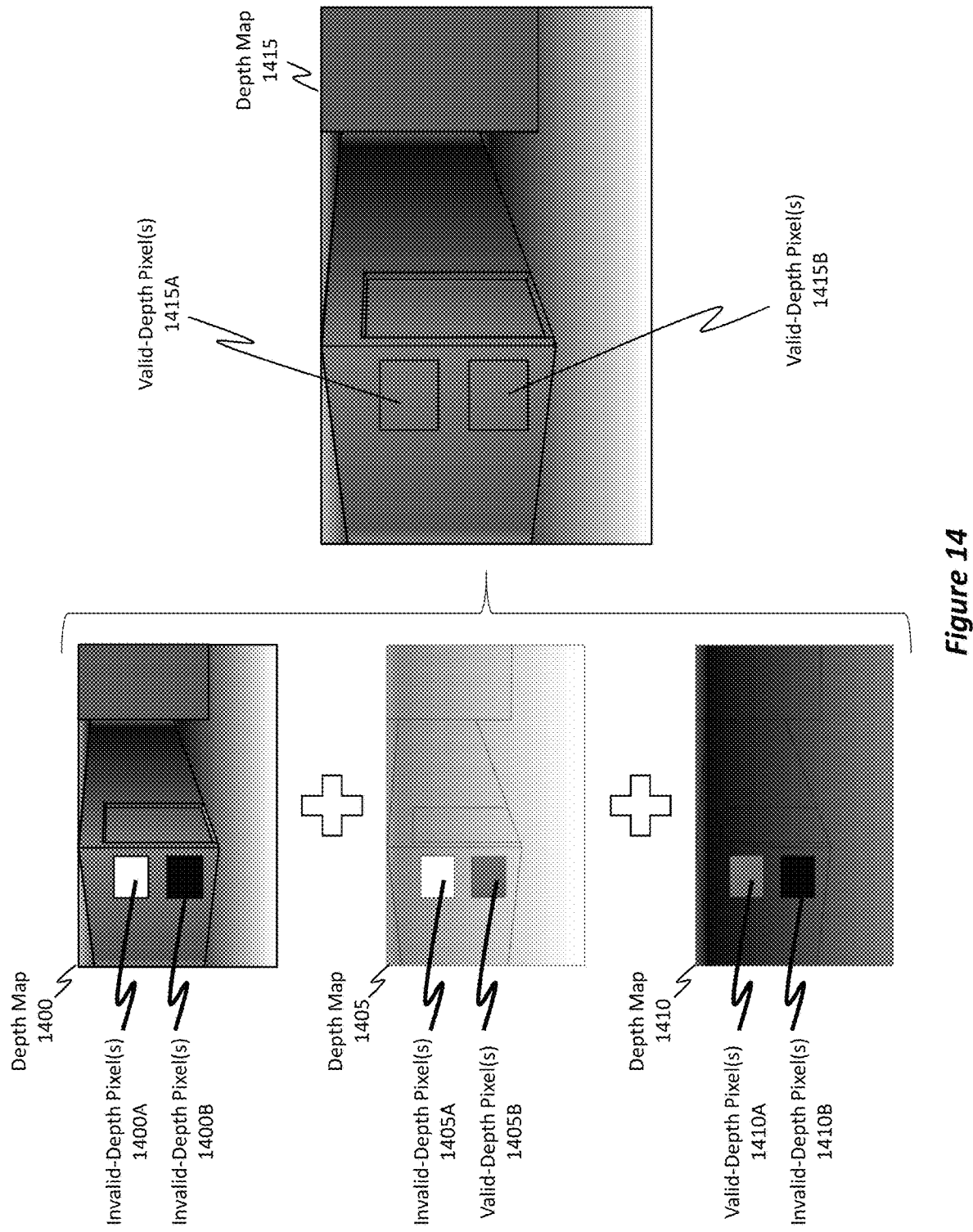
FIG. 14 illustrates an example technique of using depth information from subsequently generated depth maps, which were designed to focus on either previously overexposed or underexposed pixel areas, to compensate for deficiencies in an earlier depth map.

Returning to FIG. 1, method 100 describes the above operations in act 125, which occurs after a second depth map (e.g., depth map 1100 of FIG. 11 or depth map 1300 of FIG. 13) is generated based on the second set of one or more depth image(s) (e.g., depth image 1000 of FIG. 10 or depth image 1200 of FIG. 12) that were captured using either the increased exposure time (e.g., increased exposure time 1015, which is used to acquire additional photons for dimly lit areas in the environment) or the decreased exposure time (e.g., decreased exposure time 1215, which is used to acquire fewer photons for brightly lit areas in the environment). Specifically, in act 125, selected portions of the second depth map are merged with the first depth map by replacing the invalid-depth pixels of the first depth map with corresponding newly acquired valid-depth pixels of the second depth map. FIG. 14 is representative of the operations described in act 125.

Specifically, FIG. 14 shows a first depth map 1400, which was generated based on depth images that used a previous exposure time and which corresponds to the "first" depth map mentioned in act 105 of method 100. Here, first depth map 1400 includes invalid-depth pixel(s) 1400A, which occurred because the image pixels in the depth images were overexposed due to brightness, and includes invalid-depth pixel(s) 1400B, which occurred because the image pixels in the depth images were underexposed due to dimness.

In response to the depth invalidity conditions identified in depth map 1400, the embodiments determined that one or more additional depth maps should be generated in order to resolve or compensate for the depth deficiencies (e.g., invalid-depth pixel(s) 1400A and 1400B) found in depth map 1400. Consequently, the embodiments caused additional depth images to be acquired using an increased exposure time for their depth sensors, and then generated depth map 1405. Here, depth map 1405 is shown as having invalid-depth pixel(s) 1405A for the brightly lit areas, but it now has valid-depth pixel(s) 1405B for the dimly lit areas. The valid-depth pixel(s) 1405B occurred as a result of using the increased exposure time to thereby allow additional photons to be collected (and thus preventing an underexposure condition from occurring).

Similarly, the embodiments caused additional depth images to be acquired using a decreased exposure time for their depth sensors, and then generated depth map 1410. Here, depth map 1410 is shown as having valid-depth pixel(s) 1410A for the brightly lit areas and as having invalid-depth pixel(s) 1410B for the dimly lit areas. The valid-depth pixel(s) 1410A occurred as a result of using the decreased exposure time to thereby allow fewer photons to be collected (and thus preventing an overexposure condition from occurring).

Accordingly, in some embodiments, a previous exposure time that was used for an earlier depth map may have been selected in an effort to maximize or increase an overall average resolution or intensity for all of the image pixels in an initial/first set of one or more depth image(s). In contrast, the increased exposure time or the decreased exposure time of the subsequent depth images (resulting in subsequent depth maps being generated) is selected to maximize or increase selective resolutions and intensities for only some, but not all, image pixels in a second/subsequent set of one or more depth image(s).

FIG. 14 shows how the data from the valid-depth pixel(s) 1405B and the data from the valid-depth pixel(s) 1410A (i.e. selected portions of the two different subsequently-generated depth maps) can be merged with the first depth map 1400 in order to compensate or correct for the deficiencies (e.g., invalid-depth pixel(s) 1400A and 1400B) in that first depth map 1400. As a consequence of the merging operation, a newly merged depth map 1415 is generated and now includes accurate depth readings at locations that were previously invalid.

To clarify, newly merged depth map 1415 is shown as including valid-depth pixel(s) 1415A (which were generated from the valid-depth pixel(s) 1410A) and valid-depth pixel(s) 1415B (which were generated from the valid-depth pixel(s) 1405B) at the locations that were previously deficient in depth map 1400. The other depth pixels in the depth map were already accurately mapped. Accordingly, method 100 of FIG. 1 relates to a method for using depth data from a second or any number of subsequent depth maps, which were specially designed to compensate for certain deficiencies identified within a first or earlier depth map, to thereby selectively resolve the identified deficiencies in the first depth map. FIG. 1 shows how method 100 can repeat itself (via act 130) until a final depth map is generated, where the final depth map has accurate depth measurements for each depth pixel in a depth map. The repetition can occur until a desired accuracy metric is satisfied and/or until a maximum number of permitted iterations is reached.

Some embodiments can be selectively triggered when to perform the processes described in connection with FIG. 14 and even the method 100 of FIG. 1. For instance, some embodiments refrain from expending the additional compute required to perform these processes until such time as a threshold number of depth pixels or a threshold amount of area in the depth map is identified as being invalid. For instance, if only a small area in the depth map (i.e. an area small enough to not exceed a minimum area threshold), then it may not be computationally worthwhile to expend the additional compute required to re-scan the environment to obtain an additional depth map.

In some embodiments, these operations are triggered in response to detecting a threshold number of overexposed image pixels or even a threshold number of underexposed image pixels. Some embodiments trigger these operations in response to a determination that a heightened degree of surface reconstruction data is required for a particular application. For instance, suppose a particular application requires high levels of mapping precision/depth detection. In response to this determined need, the embodiments can then be triggered to perform these operations. Accordingly, any number of triggering conditions may be considered in determining when to perform the disclosed operations.

Some embodiments are triggered to performing these operations upon detecting that a threshold percentage of the total number of image pixels are identified as being invalid. The particular percentage can be set to any value. Some example percentages include, but are not limited to, 5% 10%, 15%, 20%, 25%, 30%, 35%, 40%, 45%, 50%, or any percentage above 50%.

Some embodiments are triggered based on the number of identified groups or modes detected in the histogram. That is, the image pixels can potentially be split into different groups in the depth image, and then the histogram can be configured to reflect these different groups. Based on the number of modes in the histogram, the embodiments can then be triggered to perform the disclosed operations.

Yet another triggering mechanism can be based on user input. For instance, the user can enter input (e.g., by selecting a particular environmental region in the HMD or by selecting a region in a depth map displayed by the HMD) to trigger additional depth maps being acquired for those selected regions.

Determining how Many Subsequent Depth Maps should be Generated

Figure 15:
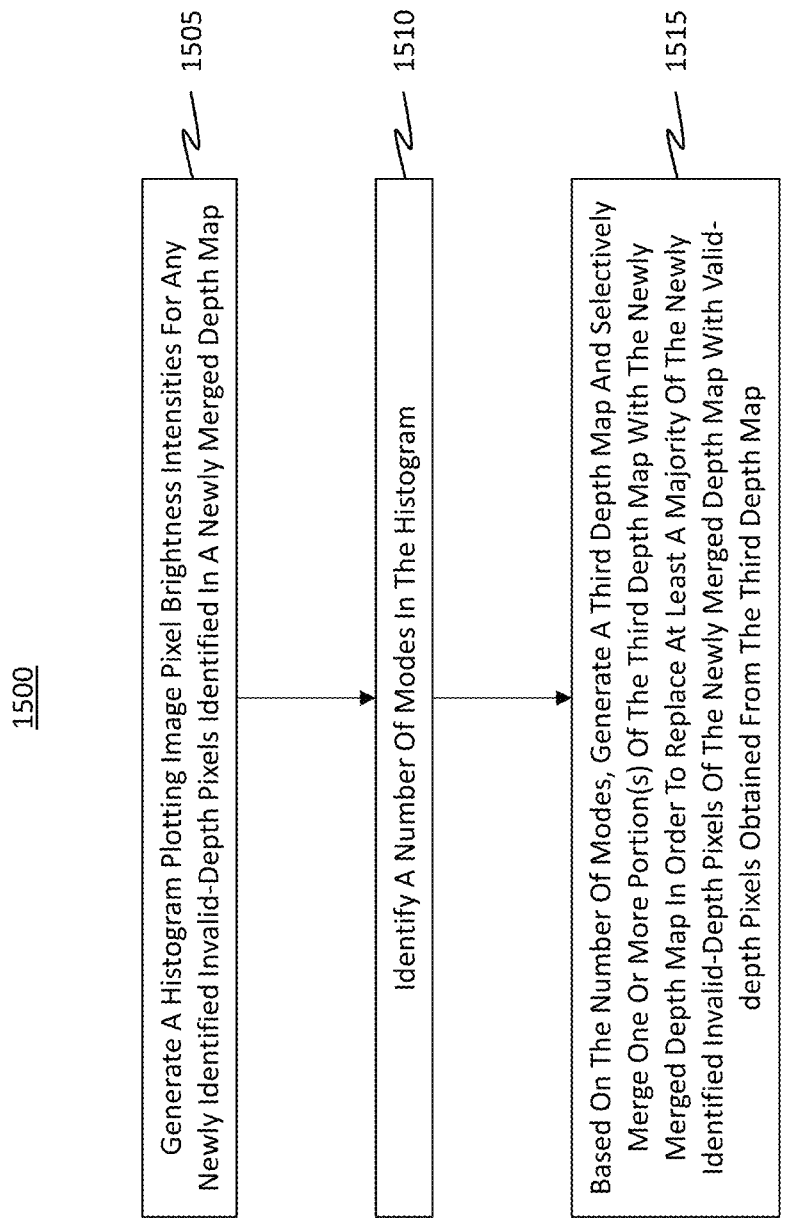
FIG. 15 illustrates a flowchart of an example method for determining how many subsequent depth maps should be generated to compensate for the deficiencies identified in an earlier depth map.

Some embodiments use a histogram (e.g., histogram 900 from FIG. 9) to determine how many subsequent depth maps should be generated to compensate for the deficiencies of an earlier depth map. FIG. 15, for example, relates to a method 1500 of using histogram data to make this determination. In some cases, method 1500 can be performed after a second or subsequent depth map has already been selectively merged with a first or previous depth map to form the so-called "newly merged depth map" discussed in connection with FIG. 14. To clarify, in some cases, method 1500 can be performed during any number of subsequent iterations of method 100 or, alternatively, method 1500 can be performed during the first iteration of method 100 from FIG. 1.

In any event, method 1500 includes an act (act 1505) of generating a histogram plotting image pixel brightness intensities of image pixels corresponding to any newly identified invalid-depth pixels identified in the newly merged depth map (or even of the first depth map discussed in connection with method 100). Next, method 100 includes an act (act 1510) of identifying a number of modes in the histogram. The modes can be identified in the manner described earlier (e.g., a single peak or a group of peaks).

Based on the number of identified modes, method 1500 then includes an act (act 1515) of generating a third or subsequent depth map (e.g., if method 1500 is being performed in connection with a first iteration of method 100, then this subsequent depth map may be the so-called "second" depth map, whereas if method 1500 is being performed in connection with a second or third iteration of method 100, then this subsequent depth map may be a third, fourth, fifth, etc. depth map). Additionally, this third or subsequent depth map was specifically designed in order to compensate for deficiencies identified in the previous depth map.

For example, if the previous depth map included depth pixels corresponding to overexposed image pixels, then this subsequent depth map may have been generated using a reduced exposure time to capture its depth images. This reduced exposure time will prevent the image pixels in the depth images from becoming overexposed and thus will enable the resulting depth map to have valid or accurate depth measurements for brightly lit areas.

Similarly, if the previous depth map included depth pixels corresponding to underexposed image pixels, then the subsequent depth map may have been generated using an increased exposure time to capture its depth images. This increased exposure time will prevent the image pixels in the depth images from being underexposed and thus will enable the resulting depth map to have valid or accurate depth measurements for dimly lit areas.

In situations where the histogram has only a single mode (e.g., corresponding to either overexposure or underexposure, but not to both), then only a single subsequent depth map will initially be generated and used to compensate for the deficiencies of the earlier depth map. If the histogram has multiple modes (e.g., corresponding to a scenario in which the environment includes both brightly lit areas and dimly lit areas), then multiple subsequent depth maps will be generated and used to compensate for the deficiencies of the earlier depth map.

One or more portion(s) of the newly merged depth map in act 1515 (i.e. it is now actually considered to be a "previous" depth map) are then selectively merged with the third or subsequent depth map in order to replace at least a majority of the newly identified invalid-depth pixels of the newly merged depth map with valid-depth pixels obtained from the third or subsequent depth map. Consequently, a brand-new merged depth map will be formed. It should be noted that this process can occur multiple times, where the number of times is dependent on whether the resulting newly merged depth map still has deficiencies.

For example, suppose after one iteration of method 100 and/or method 1500, the newly merged depth map still has one or more deficient depth measurements. This may occur perhaps because the increased or decreased exposure time was not increased high enough or decreased low enough. In some embodiments, the increased exposure time is set to some predefined value greater than the previous exposure time. Examples of this predefined value include, but are not limited to, 1.5-times, 2-times, 3-times, 4-times, 5-times, and so forth of the previous exposure time. By way of example, suppose the previous exposure time was set to 6 milliseconds. In some embodiments, the increased exposure time may be set to 9 milliseconds (e.g., 1.5-times), 12 milliseconds, 18 milliseconds, 24 milliseconds, or even 30 milliseconds. Other predefined values, percentages, or proportions can be used as well.

Similarly, the decreased exposure time may also be set to some predefined value lower than the previous exposure time. Examples of this predefined value include, but are not limited to, 0.75-times, 0.5-times, 0.33-times, 0.25-times, 0.2-times, and so forth of the previous exposure time. By way of example, suppose the previous exposure time was set to 6 milliseconds. In some embodiments, the decreased exposure time may be set to 4 milliseconds (e.g., 0.75-times), 3 milliseconds, 2 milliseconds, 1.5 milliseconds, or even 1.2 milliseconds. Other predefined values, percentages, or proportions can be used as well.

Another example of an algorithm used to increase or decrease the exposure time can be the following: New Exposure Time=Old Exposure Time*128/I, where "I" can be set to the average intensity over all the image pixels that are either overexposed or underexposed. For instance, suppose a group of image pixels are overexposed and have an average intensity of 255.

In this case, the new exposure time will be reduced by a factor of 2. Similarly, suppose a group of image pixels are underexposed and have an average intensity of 64. In this case, the new exposure time will be increased by a factor of 2. Accordingly, this algorithm (or any other algorithm) can be used to dynamically increase or decrease the exposure time of the depth sensor.

Returning to the example, suppose the first iteration of the method caused an increased exposure time to be used (e.g., the previous exposure time was 6 milliseconds, but the increased exposure time was set to 9 milliseconds), but the resulting depth map still had one or more deficiencies because an inadequate number of photons were collected in the depth images. In this case, a second increased exposure time can be used (e.g., the previous exposure time was 9 milliseconds, but the newly increased exposure time can be set to 12 milliseconds). This iterative increase of the exposure time can occur until the resulting depth map achieves a threshold level of accuracy or until an acceptable or threshold number of deficiencies remain in the depth map. Similar adjustments can be made for the decreased exposure time.

The above example was focused on a step-wise increase or decrease of the exposure time. In some embodiments, the increase or decrease of the exposure time can follow a parabolic/quadratic adjustment. For instance, the adjustment can be $(x+y)^2$, where "x" is a constant value set to the initial exposure time and "y" corresponds to the number of iterations method 100 has gone through. For example, suppose "x" was initially set to 6 milliseconds and method 100 is on its first iteration. In this case, the increased exposure time would be set to $(6+1)^2=49$ milliseconds. Likewise, the adjustment can be set to $1/((x+y)^2)$ for the decreased exposure time. Again, suppose "x" was set to 6 milliseconds and "y" was set to 1. The resulting decreased exposure time would be 0.02 milliseconds. Using a parabolic function to increase or decrease the exposure time will result in a more radical or pronounced adjustment. Of course, these are example numbers and functions and the broader principles of being able to dynamically adjust the exposure time should be considered. To clarify, any other adjustment algorithm (e.g., $x^y$ where "x" is a constant value set to the original exposure time and "y" is the iteration number) may be used for determining how to adjust the exposure time from one iteration of method 100 to another.

In some cases, the increased exposure time and the decreased exposure time are limited to be within a range of exposure times. Notably, however, this range can be set to any desired range. In some embodiments, the range is set between about 0.01 milliseconds and about 100 milliseconds. In some embodiments, the range is set between about 0.1 milliseconds and about 33 milliseconds. Accordingly, any range may be used to limit how much the exposure time is permitted to be increased or decreased.

In some embodiments, instead of limiting the exposure times to a particular range, the permitted level of increase or decrease is restricted. For instance, some embodiments will prevent the exposure time from being increased or decreased more than a selected number of milliseconds per iteration of method 100. By way of example, the increased/decreased exposure time may be limited to being adjusted only 2, 3, 4, 5, 6, 7, 8, 9, 10 milliseconds (and so forth) per iteration, but can continue without reaching an upper exposure time limit. As an example, the initial exposure time may be set to 6 milliseconds. It can then be adjusted (per iteration) to 16 milliseconds, 26 milliseconds, 36, 46, 56, 66, and so on without reaching an upper limit (if so designed). Similarly, the decreased exposure time can be adjusted (per iteration) to 3 milliseconds, 1.5 milliseconds, 0.75 milliseconds, 0.375 milliseconds, and so on without reaching a lower limit (if so designed). In some cases, the increase or decrease can follow a Fibonacci sequence or any other defined pattern or sequence.

In some embodiment, determining how many subsequent depth maps should be generated may use or rely on any type of machine learning. The machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system). Any amount of training data may be used (and perhaps later refined) to train the machine learning algorithm to dynamically compute the number of subsequent depth maps to generate.

In some embodiments, machine learning may also be utilized to determine the level of exposure to use when obtaining a subsequent depth image (e.g., by determining how much to increase or decrease the exposure time). Additionally, the disclosed embodiments can prompt a user of the HMD to obtain depth information using another device (e.g., a flash or illumination device), or even to provide a signal or alert to the user informing the user that pixel depth information is unable to be attained by only adjusting the exposure. Additionally, machine learning may be used to predict whether unidentifiable pixels are likely to be over exposed or under exposed based on the surrounding pixels. For instance, by analyzing the attributes of pixels within a selected window of pixels, the machine learning component can predict whether a pixel (e.g., either a depth pixel or an image pixel) is invalid.

Some embodiments will restrict the number of iterations method 100 is permitted to cycle through. For instance, it may be the case that no amount of increase or decrease to the exposure time will result in improved depth measurements (e.g., perhaps the environment is too brightly lit or too dark). By limiting how many iterations method 100 is permitted to perform, the embodiments beneficially prevent wasteful processing from being performed and thus will improve the operational efficiency of the computing architecture. In some embodiments, the number of iterations and/or the increase or decrease to the exposure time can be dependent on certain environmental conditions. For instance, if the ambient light is already too high or too low, then the embodiments can restrict the number of iterations to only a single iteration. Additionally, the exposure time can be adjusted based on the ambient light conditions, with possibly longer exposure times for dim environments and shorter exposure times for bright environments.

In any event, the increased exposure time and/or the decreased exposure time is dynamically selected to maximize a subset of pixel resolutions in a second or subsequent set of depth images. To clarify, the subset of resolutions are maximized for environmental areas that were previously dim or bright in the previous depth map.

Furthermore, the increase or decrease is selected and performed without regard to the impact on the resolutions for other image pixels in the depth images. In other words, the subsequent depth map (as a result of using an increased or decreased exposure time) may have depth pixels that are invalid in a specific area whereas the previous depth map had valid-depth pixels for those same specific areas. Notably, the subsequent depth map was designed not to improve depths for those specific areas, but rather was designed to improve depth measurements for the areas that were previously deficient in the previous depth map. Consequently, the embodiments actually perform operations that may seem contrary to traditional practices because the disclosed embodiments purposely design a subsequent depth map to potentially be deficient in some areas (that were not previously deficient in an earlier depth map) and to be accurate in other areas. In this regard, subsequent depth maps are designed to improve depth measurements only for specific areas and are not designed to increase the overall accuracy of that subsequent depth map. Accordingly, the "second" depth map described in method 100 is generated subsequent to the "first" depth map such that a subsequent depth map is generated to compensate for invalid depth measurements included within a prior depth map.

Identifying Invalid-Depth Pixels

Figure 16:
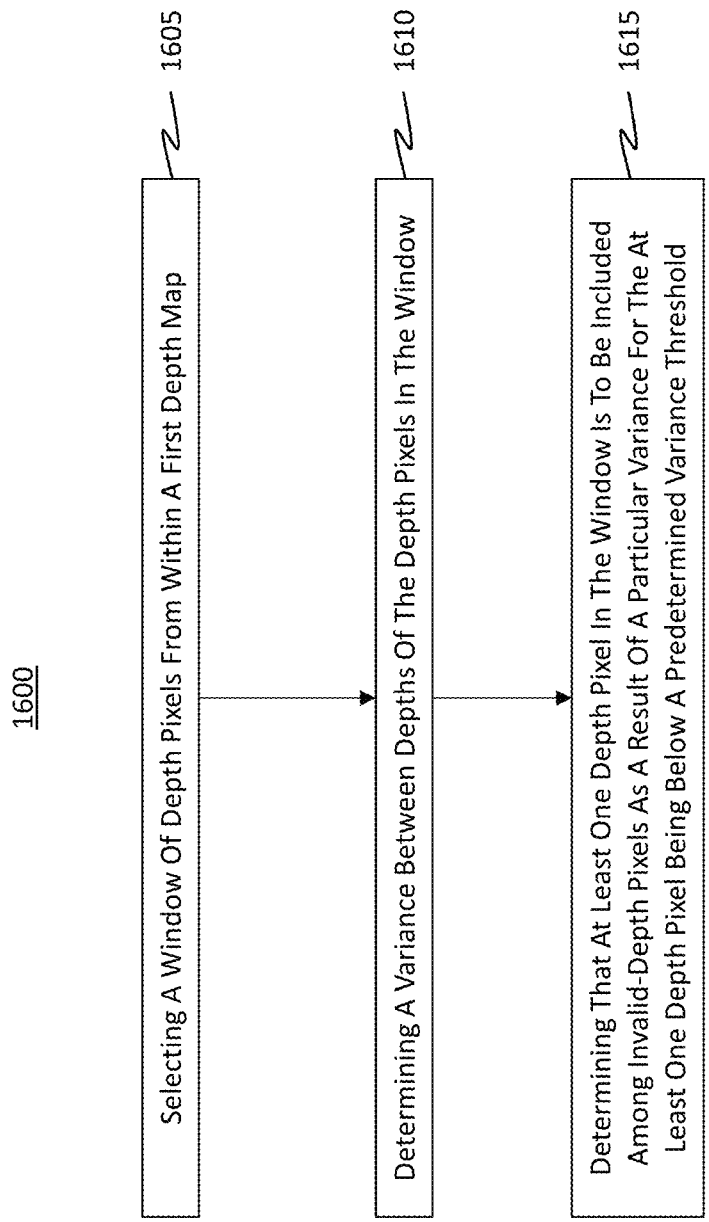
FIG. 16 illustrates a flowchart of an example method for distinguishing between valid-depth pixels and invalid-depth pixels in a depth map.
Figure 17:
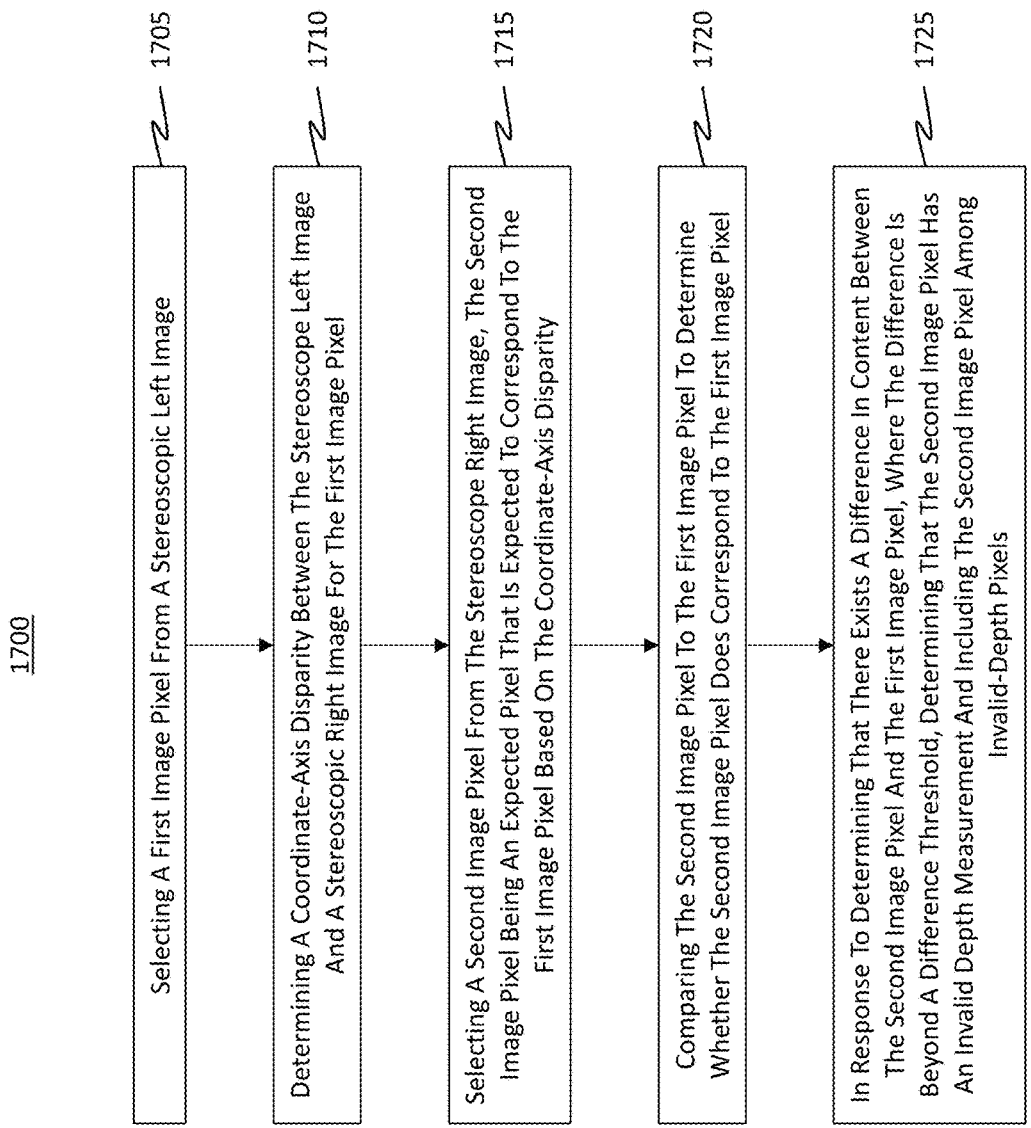
FIG. 17 illustrates another flowchart of an example method for distinguishing between valid-depth pixels and invalid-depth pixels in a depth map.

Attention will now be directed to FIGS. 16 and 17, which describe different techniques for distinguishing valid-depth pixels from invalid-depth pixels.

Specifically, method 1600 of FIG. 16 initially includes an act (1605) of selecting a window of depth pixels from within the first depth map. FIG. 7, for example, shows a window of pixels 705, comprising depth pixels A-I, and window of pixels 715, comprising depth pixels J-R.

Next, there is an act (act 1610) of determining a variance (e.g., variance 730 in FIG. 7) between depths of the depth pixels in the window. For example, suppose the window included 9 pixels. Four of the pixels may have valid depth readings while the remaining five may correspond to overexposed or underexposed image pixels and thus have invalid-depth measurements. Here, these invalidities can be identified by identifying the discrepancy or variance in depth between each of the nine pixels in the window.

In act 1615, there is a determination that at least one pixel in the window is to be included among the invalid-depth pixels as a result of a particular variance for the at least one pixel being below a predetermined variance threshold (e.g., variance threshold 735 in FIG. 7). In this manner, invalid-depth pixels can be identified within a depth map by comparing and contrasting variances between different depth pixels.

FIG. 17 is focused on another technique for identifying invalid-depth pixels using a so-called "round trip" technique (aka an iterative closest point estimation technique). Initially, suppose that the first set of depth images includes a stereoscopic left image and a stereoscopic right image. The process of distinguishing the valid-depth pixels from the invalid-depth pixels can then be performed by method 1700.

Method 1700 first includes an act (act 1705) of selecting a first image pixel from the stereoscopic left image. Then, there is an act (act 1710) of determining a coordinate-axis disparity between the stereoscopic left image and the stereoscopic right image for the first image pixel. To clarify, portions of the stereoscopic left and right images overlap with one another. Consequently, a pixel in the left image should correspond to a pixel in the right image. Act 1710 computes an estimated disparity that is predicted to exist between the left and right images (or also regions of pixels).

Next, there is an act (act 1715) of selecting a second image pixel from the stereoscopic right image. This second image pixel is an expected pixel that is expected to correspond to the first image pixel based on the coordinate-axis disparity.

The second image pixel is compared (act 1720) to the first image pixel to determine whether the second image pixel actually does correspond to the first image pixel (i.e. a round trip determination). In response to determining that there exists a difference in content between the second image pixel and the first image pixel, where the difference is beyond a difference threshold, there is an act (act 1725) of determining that the second image pixel has an invalid depth measurement. Consequently, the second image pixel is included among the invalid-depth pixels by performing this round-trip determination.

Accordingly, the disclosed embodiments operate to improve the accuracy of a depth map when attempting to map a highly dynamic environment. Specifically, the embodiments are able to customize, tailor, or design a subsequent depth map to compensate for identified deficiencies in a previous depth map. Notably, the previous depth map will have valid-depth pixels and invalid-depth pixels. The subsequent depth map is specifically designed to obtain more accurate depth measurements for the invalid-depth pixels of the previous depth map. Doing so may actually result in a number of operations being performed that are contrary to normal depth mapping techniques. Specifically, the subsequent depth map is specially designed to focus only on obtaining improved depth measurements for selected areas in the environment. Such operations may actually cause other areas of that subsequent depth map to become invalid, even though the previous depth map had valid depth measurements for those same areas. Accordingly, the disclosed embodiments relate to new, improved, and entirely unique techniques for increasing the overall accuracy of a depth map by allowing a subsequent depth map to be selectively merged with a previous depth map.

Figure 18:
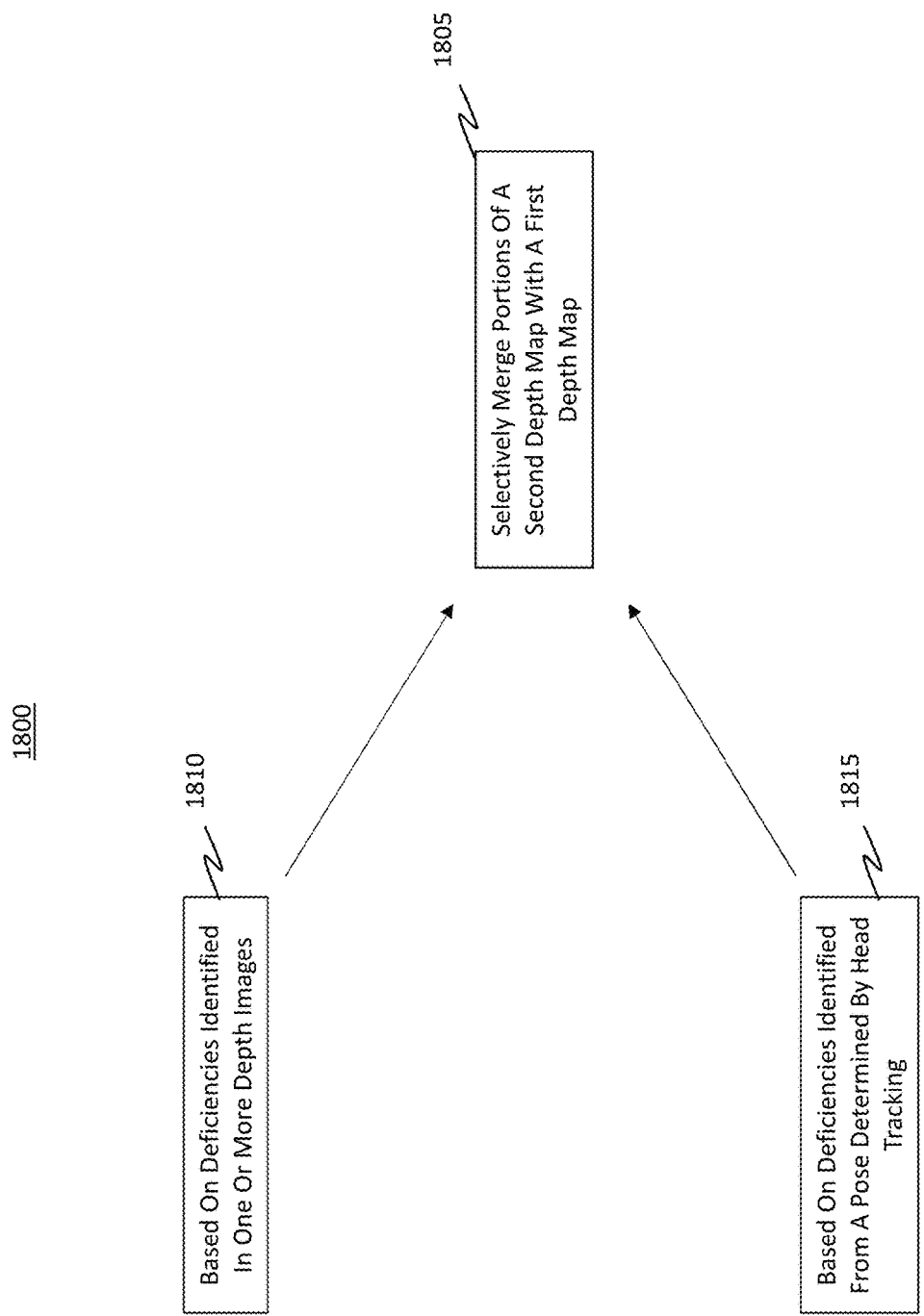
FIG. 18 illustrates how multiple different techniques may be used to determine how to merge depth maps together to improve depth accuracy. For instance, some techniques are focused on using a so-called iterative closest point estimation based on pixel matching between different depth images while another technique is focused on using headtracking pose information to overlap depth maps.

FIG. 18 illustrates another technique 1800 for determining how to merge depth maps so as to improve accuracy. That is, up to this point, some of the embodiments have been focused on selectively merging portions of a second depth map with portions of a first depth map (1805) based on deficiencies identified in one or more depth images (1810) (e.g., a form of iterative closest point estimation based on matching the depth image with the previous frame's depth image). Some additional, or alternative, embodiments can perform these selective merging operations based on deficiencies identified from a pose determined by head tracking (1815).

In particular, the HMD can be configured to detect any number of poses of the HMD relative to the surrounding environment (e.g., by performing head tracking). Any number of head tracking poses can then be used to overlap those poses' corresponding depth maps. From this overlap operation, the embodiments can then identify areas within any particular depth map that is deficient (in terms of depth). In this regard, a diff operation can be performed between multiple different depth maps based on those depth maps being overlapped one with another. Furthermore, these particular depth maps can be computed based on head tracking pose determinations.

Accordingly, in some embodiments, the process of resolving invalid-depth pixels of a first depth map by replacing those invalid-depth pixels with newly-acquired valid-depth pixels obtained from a second depth map is performed by aligning the first depth map with the second depth map using at least one of the following techniques: (i) pose determinations obtained from head tracking (e.g., by overlapping the first and second depth maps) or (ii) iterative closest point matching between the first depth map and the second depth map.

Adjusting Illumination Intensity to Improve Depth Detection

In addition to (or alternative to) adjusting the depth sensor's exposure time to achieve improved depth detection, the embodiments can additionally dynamically adjust the depth sensor's illumination intensity to achieve improved depth detection. For instance, by projecting increased amounts of illumination towards dim areas and reduced amounts of illumination towards bright areas, the embodiments can achieve improved depth detection in a similar manner as was achieved by increasing or decreasing the exposure time. It should be explicitly noted that increasing or decreasing illumination intensity can be performed in conjunction with or as an alternative to increasing or decreasing exposure time. Therefore, any of the processing, methods, techniques, thresholds, alternatives, variations, machine learning, or any of the subject matter discussed in connection with adjusting exposure time can also be performed in connection with adjusting the illumination intensity (and vice-versa). As such, the two operations (i.e. exposure adjustment and illumination adjustment) can be performed in a simultaneous and mutual manner.

Figure 19:
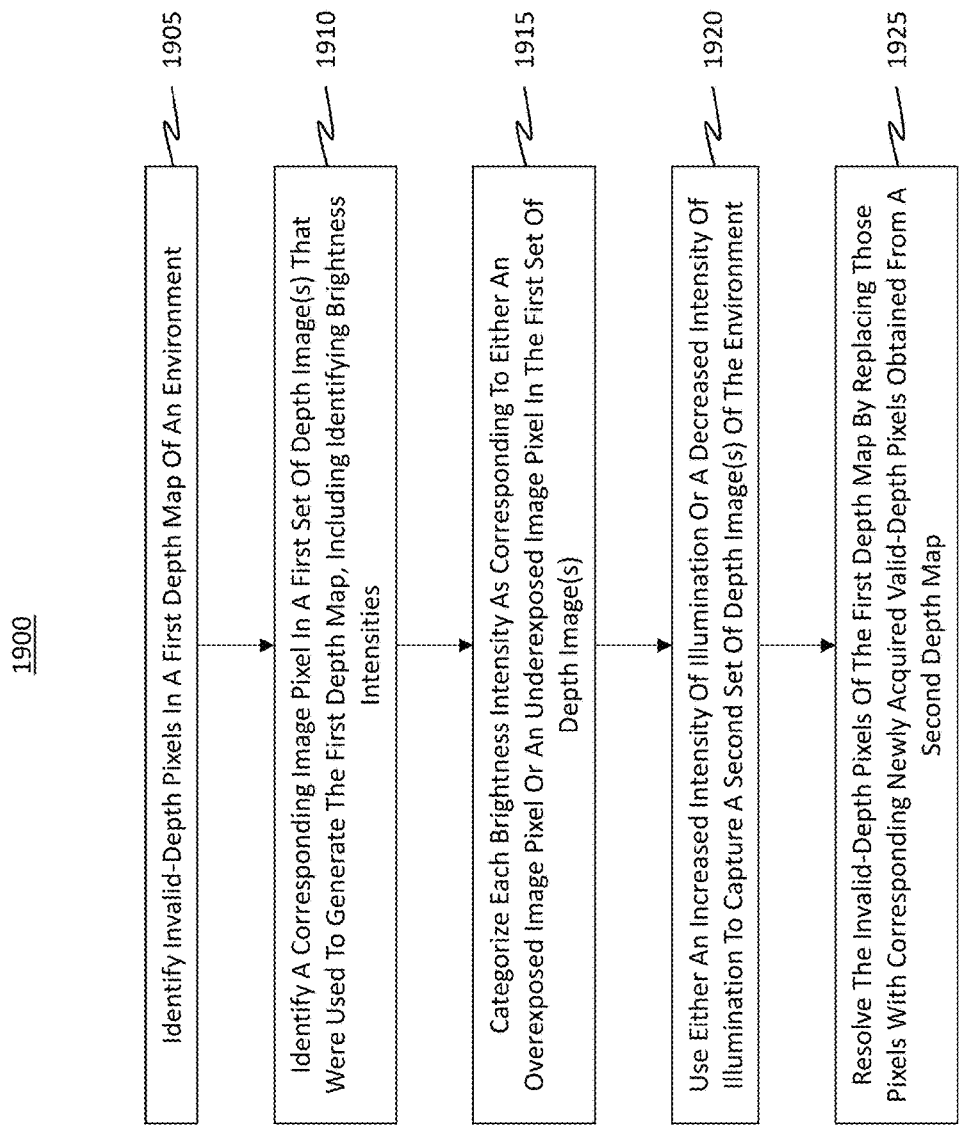
FIG. 19 illustrates a flowchart of an example method for dynamically increasing or decreasing an illumination intensity to improve depth accuracy.

Attention will now be directed to FIG. 19, which illustrates a flowchart of an example method (1900) for using depth data from a second depth map, which was designed to compensate for certain depth deficiencies identified within a first depth map and which was generated by selectively adjusting an intensity of illumination that was caused to be projected by a depth sensor to provide additional illumination for dark areas of an environment or to provide less illumination for bright areas, to thereby selectively resolve the deficiencies in the first depth map.

Initially, method 1900 includes an act (1905) of identifying invalid-depth pixels in a first depth map of an environment. Then, for each of at least some of the invalid-depth pixels, there is an act (1910) of identifying a corresponding image pixel in a first set of one or more depth image(s) that were used to generate the first depth map. This identification process includes identifying a brightness intensity of the corresponding image pixel such that a plurality of brightness intensities are identified. Method 1900 also includes an act (1915) of categorizing each brightness intensity in the plurality of brightness intensities as corresponding to either an overexposed image pixel or an underexposed image pixel in the first set of one or more depth image(s). Notably, overexposed image pixels correspond to bright areas in the environment and underexposed image pixels correspond to dim areas in the environment.

Then, as compared to a previous intensity of illumination that was caused to be projected by a depth sensor and that was used when capturing the first set of one or more depth image(s), method 1900 includes an act (1920) of using either an increased intensity of illumination or a decreased intensity of illumination to capture a second set of one or more depth image(s) of the environment. By way of example, the depth sensor may have or may be associated with a light emitter. Examples of light emitters include, but are not limited to, light emitting diodes (LED), flood projectors, lasers, laser diodes, or any other type of device capable of emitting light. The light can be visible light, infrared light, or a combination of visible and infrared light. The light can be structured light (e.g., having a known dot pattern to provide texture to a scene) or it can be unstructured light. Accordingly, any type of light may be used to illuminate an environment to enable the depth sensor to determine depths of the environment.

It should be noted that increased illumination can be used to illuminate any detected dim or dark areas in the environment, similar to how an increased exposure was used for dim areas. Alternatively, reduced (or none at all) illumination can be used to illuminate bright areas of the environment, similar to how a decreased exposure time was used for bright areas. Additionally, the embodiments can determine when increased or reduced illumination is required by performing an iterative closest point estimation based on matching a depth image with a previous frame's depth image (i.e. identifying deficiencies in depth images) and/or by using head tracking pose determinations to overlap depth maps, as discussed earlier.

Additionally, some embodiments increase or decrease both the illumination intensity and the exposure time of the depth sensor for further visibility of dim/dark regions or of bright regions, respectively. Some embodiments are triggered to obtain the additional/subsequent depth map based on determining that there exists a threshold number of invalid-depth pixels or pixel regions within an initial depth map.

After a second depth map is generated based on the second set of one or more depth image(s), method 1900 includes an act (1925) of resolving the invalid-depth pixels of the first depth map by replacing those invalid-depth pixels with corresponding newly acquired valid-depth pixels obtained from the second depth map. These newly acquired valid-depth pixels were captured as a result of using either the increased intensity of illumination or the decreased intensity of illumination.

In some embodiments, the depth sensor includes its own light emitter while in other embodiments, the light emitter is associated with the depth sensor but may not be an integral part of the depth sensor. For instance, the HMD may include light emitters that can be multi-purposed to operate for any number of components (e.g., hand tracking components, head tracking components, depth sensing components, etc.). In this regard, the depth sensor can send any number of instructions to control when the light emitter is to emit the illumination. In some embodiments, the light emitter may not even be a part of the HMD. For instance, an external emitter can be placed in the environment and can be controlled to selectively emit light.

Example Computer Systems

Attention will now be directed to FIG. 20 which illustrates an example computer system 2000 that may include and/or be used to perform the operations described herein. In particular, this computer system 2000 may be in the form of the MR systems/devices that were described earlier. As such, the computer system may be one of the following: a virtual-reality system or an augmented-reality system.

Computer system 2000 may take various different forms. For example, in FIG. 20, computer system 2000 may be embodied as a tablet 2000A, a desktop 2000B, or an HMD 2000C (with a corresponding wearable display), such as those described throughout this disclosure. The ellipsis 2000D demonstrates that computer system 2000 may be embodied in any form.

Computer system 2000 may also be a distributed system that includes one or more connected computing components/devices that are in communication with computer system 2000, a laptop computer, a mobile phone, a server, a data center, and/or any other computer system. The ellipsis 2000D also indicates that other system subcomponents may be included or attached with the computer system 2000, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, and any type of mobile phone.

In its most basic configuration, computer system 2000 includes various different components. FIG. 20 shows that computer system 2000 includes at least one processor(s) 2005 (aka a "hardware processing unit"), input/output ("I/O") 2010, camera system 2015 (which is representative of the depth sensors described throughout this disclosure and which may include an illuminator 2015A), and storage 2020.

I/O 2010 may include any number of input/output devices, including wearable or handheld devices. I/O 2010 may also include a wearable display, which may be used to render virtual content. Camera system 2015 may include any number of cameras, including head tracking, hand tracking, depth detection, or any other type of camera. It may also include the illuminator 2015A, which can be configured to emit the illumination described herein. These cameras may be configured in the manner described earlier (e.g., in connection with the depth sensor system 205 of FIG. 2), and the camera system 2015 may perform any of the disclosed scanning, mapping, or depth detection processes.

Storage 2020 is shown as including executable code/instructions 2025. The executable code/instructions 2025 represent instructions that are executable by computer system 2000 to perform the disclosed operations, such as those described in the various methods.

Storage 2020 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well. As used herein, the term "executable module," "executable component," or even "component" can refer to software objects, routines, or methods that may be executed on computer system 2000. The different components, modules, engines, and services described herein may be implemented as objects or processors that execute on computer system 2000 (e.g. as separate threads).

The disclosed embodiments may comprise or utilize a special-purpose or general-purpose computer including computer hardware, such as, for example, one or more processors (such as processor(s) 2005) and system memory (such as storage 2020), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras, accelerometers, gyroscopes, acoustic sensors, magnetometers, etc.) or devices via a network 2030. For example, computer system 2000 can communicate the cloud to obtain any number of previous depth maps, as described earlier.

Furthermore, computer system 2000 may also be connected through one or more wired or wireless networks 2030 to remote/separate computer systems(s) that are configured to perform any of the processing described with regard to computer system 2000.

During use, a user of computer system 2000 can perceive information (e.g., an MR scene/environment (including VR or AR)) through a display screen that is included with the I/O 2010 of computer system 2000 and that is visible to the user. The I/O 2010 and sensors with the I/O 2010 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor(s) 2005, to render one or more virtual objects within an MR scene. As a result, the virtual objects accurately move in response to a movement of the user and/or in response to user input as the user interacts within the virtual scene.

A "network," like the network 2030 shown in FIG. 20, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2030. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor(s) 2005). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices that store computer executable instructions that are executable by the one or more processors to cause the computer system to at least:
      identify invalid-depth pixels in a first depth map of an environment, including identifying, using the first depth map as a reference, x-y depth coordinates for the invalid-depth pixels, said x-y depth coordinates referring to positions in the first depth map where the invalid-depth pixels are located;
      for each of at least some of the invalid-depth pixels, use the x-y depth coordinate for said each invalid-depth pixel to identify a corresponding x-y image coordinate in a first set of one or more depth image(s) that were used to generate the first depth map and to identify a corresponding image pixel located at the corresponding x-y image coordinate, including identifying a brightness intensity of said corresponding image pixel such that a plurality of brightness intensities are identified;
      categorize each brightness intensity in the plurality of brightness intensities as corresponding to either an overexposed image pixel or an underexposed image pixel in the first set of one or more depth image(s), overexposed image pixels correspond to bright areas in the environment and underexposed image pixels correspond to dim areas in the environment;
      as compared to a previous exposure time used when capturing the first set of one or more depth image(s), use either an increased exposure time or a decreased exposure time to capture a second set of one or more depth image(s) of the environment; and
      after a second depth map is generated based on the second set of one or more depth image(s) that were captured using either the increased exposure time or the decreased exposure time, selectively merge one or more portion(s) of the second depth map with the first depth map by replacing the invalid-depth pixels of the first depth map with corresponding newly acquired valid-depth pixels of the second depth map.

2. The computer system of claim 1, wherein, in addition to increasing or decreasing the exposure time, an illumination intensity of the depth sensor is correspondingly increased or decreased to provide additional illumination for the dim areas or, alternatively, to provide less illumination for the bright areas.

3. The computer system of claim 1, wherein the plurality of brightness intensities are all within a range spanning between 0 and 255, brightness intensities for the overexposed image pixels are within a first threshold value of 255 and brightness intensities for the underexposed image pixels are within a second threshold value of 0.

4. The computer system of claim 3, wherein the first threshold value is a value of 10 such that any image pixel having a corresponding brightness intensity between 245 and 255 is identified as being overexposed and is included among the overexposed image pixels, and wherein the second threshold value is also a value of 10 such that any image pixel having a corresponding brightness intensity between 0 and 10 is identified as being underexposed and is included among the underexposed image pixels.

5. The computer system of claim 1, wherein the increased exposure time is used when the second set of one or more depth image(s) are designed to capture the dim areas of the environment and the decreased exposure time is used when the second set of one or more depth image(s) are designed to capture the bright areas of the environment.

6. The computer system of claim 1, wherein the first set of one or more depth image(s) is captured using a stereoscopic depth camera system or, alternatively, a time of flight system.

7. The computer system of claim 6, wherein the stereoscopic depth camera system is an active illumination stereoscopic depth camera system that illuminates using structured light.

8. The computer system of claim 6, wherein the stereoscopic depth camera system is a passive stereoscopic depth camera system.

9. The computer system of claim 1, wherein the invalid-depth pixels are identified as having invalid depth measurements as a result of certain image pixels, which correspond to the invalid-depth pixels, having brightness intensity values being within threshold values of either an overexposed pixel value or an underexposed pixel value.

10. The computer system of claim 1, wherein, after the second depth map is selectively merged with the first depth map to form a newly merged depth map, execution of the computer-executable instructions further causes the computer system to:
generate a histogram plotting image pixel brightness intensities corresponding to any newly identified invalid-depth pixels identified in the newly merged depth map;
identify a number of modes in the histogram; and
based on the number of modes, generate a third depth map and selectively merge one or more portion(s) of the third depth map with the newly merged depth map in order to replace at least a majority of the newly identified invalid-depth pixels of the newly merged depth map with valid-depth pixels obtained from the third depth map.

11. The computer system of claim 1, wherein the invalid-depth pixels of the first depth map represent that the first depth map includes one or more deficiencies with regard to mapping depths of the environment, and wherein the second depth map is generated to compensate for the one or more deficiencies of the first depth map.

12. A method for using depth data from a second depth map, which was specially designed to compensate for certain deficiencies identified within a first depth map, to thereby selectively augment said deficiencies in the first depth map, said method comprising:
identifying invalid-depth pixels in a first depth map of an environment, including identifying, using the first depth map as a reference, x-y depth coordinates for the invalid-depth pixels, said x-y depth coordinates referring to positions in the first depth map where the invalid-depth pixels are located;
for each of at least some of the invalid-depth pixels, using the x-y depth coordinate for said each invalid-depth pixel to identify a corresponding x-y image coordinate in a first set of one or more depth image(s) that were used to generate the first depth map and to identify a corresponding image pixel located at the corresponding x-y image coordinate, including identifying a brightness intensity of said corresponding image pixel such that a plurality of brightness intensities are identified;
categorizing each brightness intensity in the plurality of brightness intensities as corresponding to either an overexposed image pixel or an underexposed image pixel in the first set of one or more depth image(s), overexposed image pixels correspond to bright areas in the environment and underexposed image pixels correspond to dim areas in the environment;
as compared to a previous exposure time used when capturing the first set of one or more depth image(s), using either an increased exposure time or a decreased exposure time to capture a second set of one or more depth image(s) of the environment; and
after a second depth map is generated based on the second set of one or more depth image(s), selectively merging one or more portion(s) of the second depth map with the first depth map.

13. The method of claim 12, wherein the increased exposure time or the decreased exposure time is selected to maximize image pixel resolutions in the second set of one or more depth image(s) for only the dim areas of the environment or the bright areas of the environment, respectively, and is selected without regard to an impact on resolutions for other image pixels in the second set of one or more depth image(s).

14. The method of claim 12, wherein the second depth map is generated subsequent to the first depth map such that a subsequent depth map is generated to compensate for invalid depth measurements included within a prior depth map.

15. The method of claim 12, wherein the method further includes generating a histogram that provides a count indicating how many invalid-depth pixels are included in the first depth map, and wherein the histogram is formatted to illustrate the count based on the brightness intensities.

16. The method of claim 12, wherein the increased exposure time and the decreased exposure time are within a range of times spanning between about 0.1 milliseconds and about 30 milliseconds.

17. A computer system comprising:
one or more processors; and
one or more computer-readable hardware storage devices that store computer-executable instructions that are executable by the one or more processors to cause the computer system to at least:

identify invalid-depth pixels in a first depth map of an environment, including identifying, using the first depth map as a reference, x-y depth coordinates for the invalid-depth pixels, said x-y depth coordinates referring to positions in the first depth map where the invalid-depth pixels are located;

for each of at least some of the invalid-depth pixels, use the x-y depth coordinate for said each invalid-depth pixel to identify a corresponding x-y image coordinate in a first set of one or more depth image(s) that were used to generate the first depth map and to identify a corresponding image pixel located at the corresponding x-y image coordinate, including identifying a brightness intensity of said corresponding image pixel such that a plurality of brightness intensities are identified;

categorize each brightness intensity in the plurality of brightness intensities as corresponding to either an overexposed image pixel or an underexposed image pixel in the first set of one or more depth image(s), overexposed image pixels correspond to bright areas in the environment and underexposed image pixels correspond to dim areas in the environment;

as compared to a previous intensity of illumination that was caused to be projected by a depth sensor and that was used when capturing the first set of one or more depth image(s), use either an increased intensity of illumination or a decreased intensity of illumination to capture a second set of one or more depth image(s) of the environment; and after a second depth map is generated based on the second set of one or more depth image(s), resolve the invalid-depth pixels of the first depth map by replacing said invalid-depth pixels with corresponding newly acquired valid-depth pixels obtained from the second depth map, which newly acquired valid-depth pixels were captured as a result of using either the increased intensity of illumination or the decreased intensity of illumination.

18. The computer system of claim 17, wherein, in addition to increasing or decreasing the intensity of illumination, an exposure time of the depth sensor is correspondingly increased or decreased.

19. The computer system of claim 17, wherein resolving the invalid-depth pixels of the first depth map by replacing said invalid-depth pixels with the corresponding newly acquired valid-depth pixels obtained from the second depth map is performed by aligning the first depth map with the second depth map using at least one of the following:

pose determinations obtained from head tracking; or iterative closest point matching between the first depth map and the second depth map.

* * * * *